US012647687B2

(12) United States Patent
Hagen et al.

(10) Patent No.: US 12,647,687 B2
(45) Date of Patent: *\*Jun. 2, 2026**

(54) MOBILE APPARATUS WITH COMPUTER VISION ELEMENTS FOR PRODUCT IDENTIFIER DETECTION WITH MINIMAL DETECTION ADJUSTMENTS

(71) Applicant: Target Brands, Inc., Minneapolis, MN (US)

(72) Inventors: Todd A. Hagen, Minneapolis, MN (US); Donnie Tolbert, Minneapolis, MN (US); Arne Wilkin, Minneapolis, MN (US); John Ojanen, Minneapolis, MN (US); Nicholas Lojewski, Minneapolis, MN (US); Yeshwanth Gowda, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/761,491

(22) Filed: Jul. 2, 2024

(65) Prior Publication Data

US 2024/0357237 A1 Oct. 24, 2024

Related U.S. Application Data

(63) Continuation of application No. 18/079,220, filed on Dec. 12, 2022, now Pat. No. 12,058,445.

(Continued)

(51) Int. Cl.
| | |
|---|---|
| *H04N 23/695* | (2023.01) |
| *G06K 7/14* | (2006.01) |

(Continued)

(52) U.S. Cl.
CPC ......... *H04N 23/695* (2023.01); *G06K 7/1443* (2013.01); *G06T 7/70* (2017.01); *H04N 23/61* (2023.01); *H04N 23/69* (2023.01)

(58) Field of Classification Search
CPC ................................ H04N 23/695; G06T 7/70
(Continued)

(56) References Cited

U.S. PATENT DOCUMENTS

| | | | |
|---|---|---|---|
| 8,630,924 B2 | 1/2014 | Groenevelt et al. | |
| 9,536,167 B2 | 1/2017 | Schwartz | |

(Continued)

FOREIGN PATENT DOCUMENTS

WO WO2006040687 4/2006

*Primary Examiner* — Amir Shahnami

(74) *Attorney, Agent, or Firm* — Barnes & Thornburg LLP

(57) ABSTRACT

Disclosed are systems and techniques for identifying product identifiers in images. A technique can include receiving, by an edge computing device, x and y coordinates for a location of an out of stock shelf section, determining a frame of reference (FOR) based on the coordinates, the FOR including a location of a product identifier for the out of stock shelf section, determining incremental adjustments to a camera based on the FOR, instructing the camera to adjust by the incremental adjustments and capture an image of the location of the product identifier, performing image analysis on the image to identify the product identifier, determining second incremental adjustments to the camera to focus the camera on the location of the product identifier if the product identifier is not identifiable in the image, and instructing the camera to reset to original camera settings if the product identifier is identifiable in the image.

20 Claims, 14 Drawing Sheets

Related U.S. Application Data

(60) Provisional application No. 63/299,478, filed on Jan. 14, 2022.

(51) Int. Cl.
|   |   |
|---|---|
| *G06T 7/70* | (2017.01) |
| *H04N 23/61* | (2023.01) |
| *H04N 23/69* | (2023.01) |

(58) Field of Classification Search
   USPC ......................................................... 348/143
   See application file for complete search history.

(56) References Cited

U.S. PATENT DOCUMENTS

| | | | | |
|---|---|---|---|---|
| 9,996,818 | B1 | 6/2018 | Ren et al. | |
| 10,176,452 | B2 | 1/2019 | Rizzolo et al. | |
| 10,289,990 | B2 | 5/2019 | Rizzolo et al. | |
| 10,726,273 | B2 | 7/2020 | Phan et al. | |
| 2008/0077511 | A1 | 3/2008 | Zimmerman | |
| 2019/0034864 | A1 | 1/2019 | Skaff et al. | |
| 2019/0236530 | A1* | 8/2019 | Cantrell | G06V 40/23 |
| 2019/0337549 | A1* | 11/2019 | Lobo | B62B 5/0096 |
| 2020/0184411 | A1 | 6/2020 | Shah et al. | |
| 2022/0108264 | A1* | 4/2022 | Skaff | G06T 7/70 |

* cited by examiner

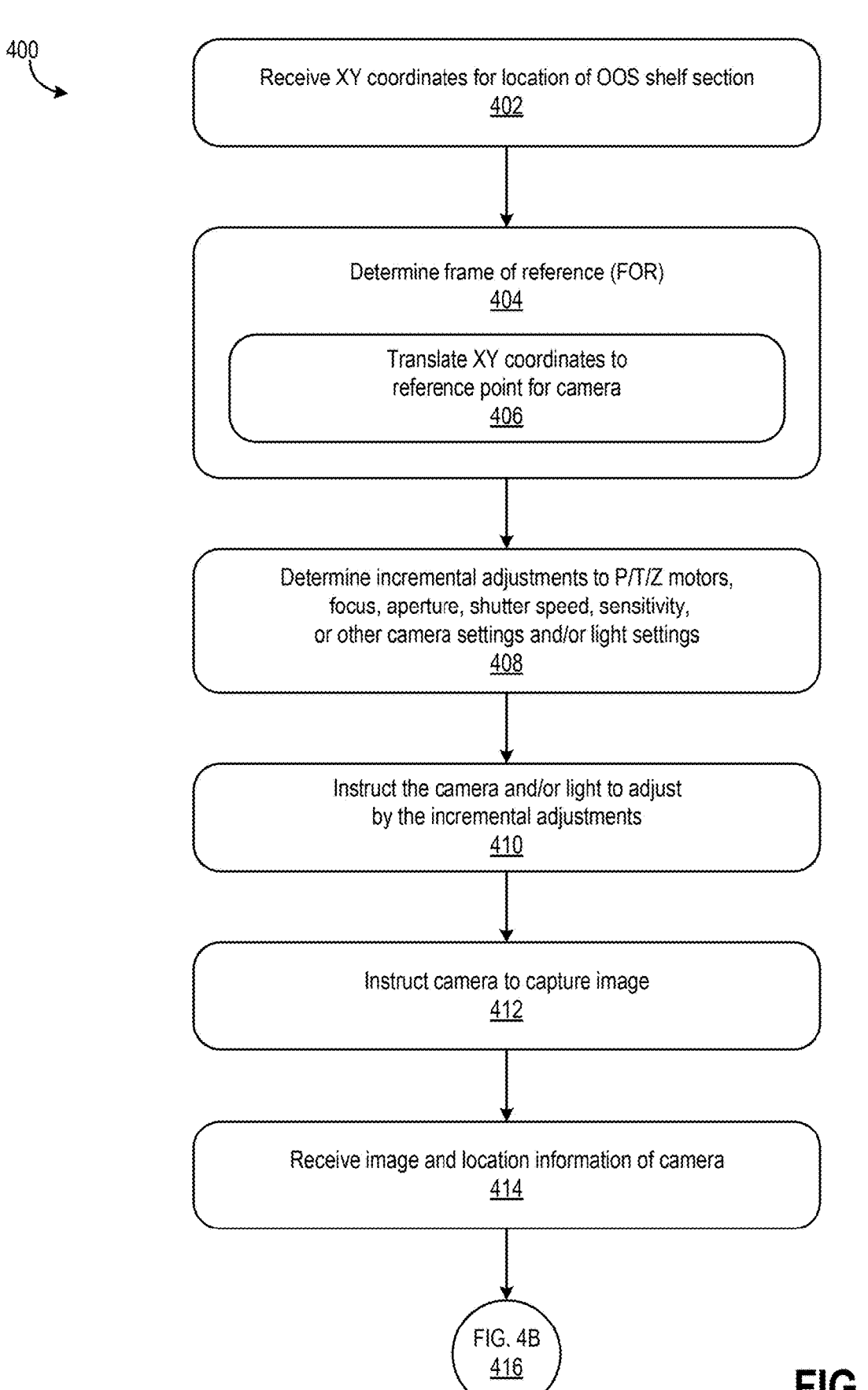

400

Receive XY coordinates for location of OOS shelf section
402

Determine frame of reference (FOR)
404

Translate XY coordinates to
reference point for camera
406

Determine incremental adjustments to P/T/Z motors,
focus, aperture, shutter speed, sensitivity,
or other camera settings and/or light settings
408

Instruct the camera and/or light to adjust
by the incremental adjustments
410

Instruct camera to capture image
412

Receive image and location information of camera
414

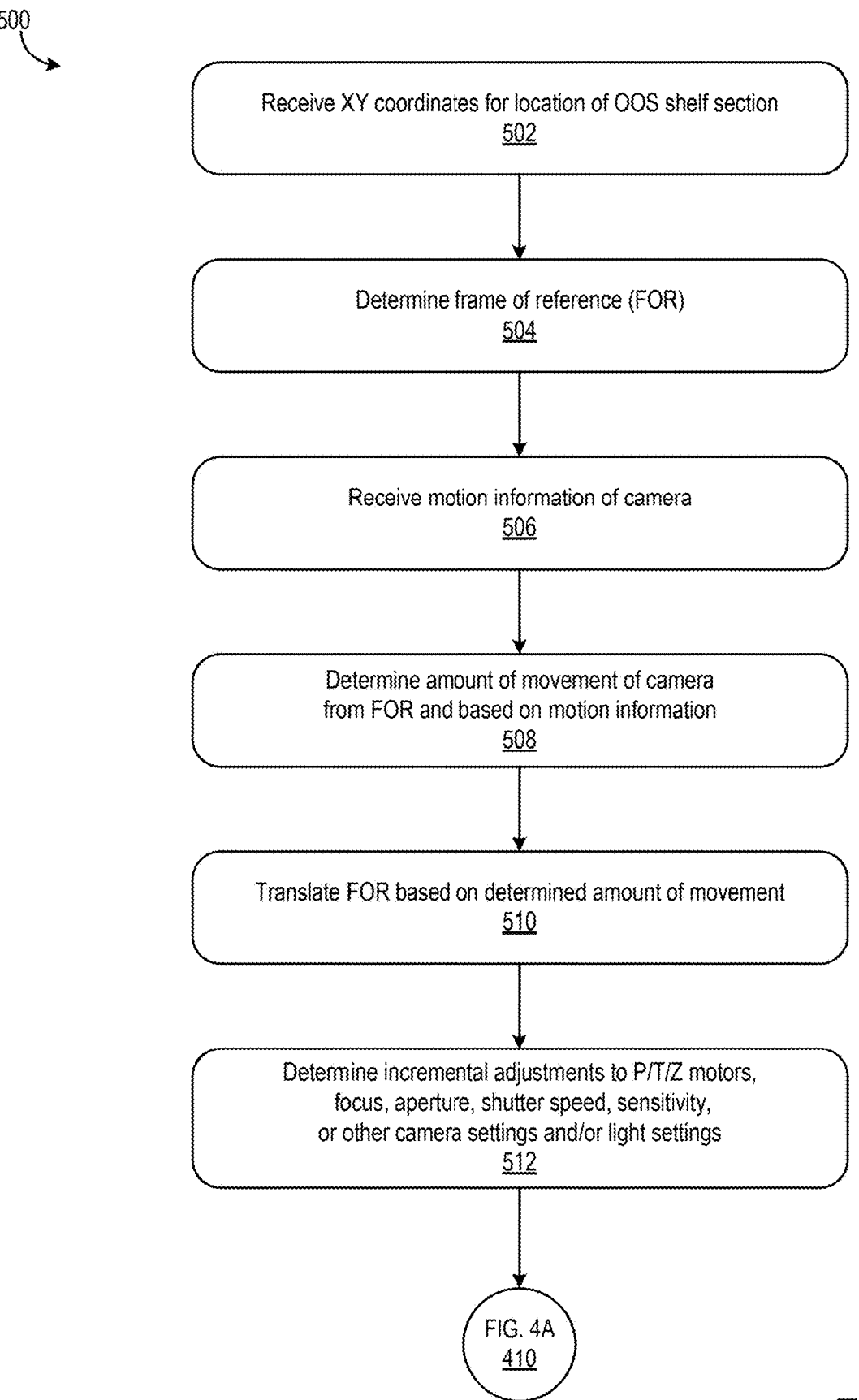

Receive XY coordinates for location of OOS shelf section
502

Determine frame of reference (FOR)
504

Receive motion information of camera
506

Determine amount of movement of camera
from FOR and based on motion information
508

Translate FOR based on determined amount of movement
510

Determine incremental adjustments to P/T/Z motors,
focus, aperture, shutter speed, sensitivity,
or other camera settings and/or light settings
512

Receive location information
1102

Determine region in store based on
the location information    1104

Region uses images to determine
stock status?    1106

Yes

No

Instruct camera(s) to capture images
of shelves in the region    1108

Instruct RFID sensor(s) to detect
products in the region    1110

Process received data to determine
stock status    1112

MOBILE APPARATUS WITH COMPUTER VISION ELEMENTS FOR PRODUCT IDENTIFIER DETECTION WITH MINIMAL DETECTION ADJUSTMENTS

CROSS-REFERENCE TO RELATED APPLICATIONS

This application is a continuation of U.S. application Ser. No. 18/079,220, filed Dec. 12, 2022, which claims the benefit of U.S. Application Ser. No. 63/299,478, filed on Jan. 14, 2022. The disclosures of the prior applications are considered part of (and are incorporated by reference in) the disclosure of this application.

TECHNICAL FIELD

This document generally describes devices, systems, and methods related to systems and methods for detecting product identifiers using iterative and incremental camera adjustments.

BACKGROUND

Stores, distribution centers, warehouses, and other facilities can store items (e.g., inventory, stock, goods, materials for sale, resale, or repair) on shelves. Each of the shelves can have sections that are designated for storing particular items. The sections can be identified by identifiers, such as barcodes, SKUs, and QR codes. The identifiers can associate the sections with the particular items to be stored in the sections. Sometimes, the sections can be depleted of one or more of the particular items stored therein. For example, consumers can remove the particular items from the sections to purchase them. Sometimes, particular items may also be stolen or displaced (e.g., abandoned or moved to another shelf) by the consumers. Users, such as employees of a store, can check whether the sections of the shelves are depleted of the particular items. An employee can walk up and down aisles of the store, taking inventory of items in each of the sections for each of the shelves. This can be a time-consuming process and can sometimes include human error. Sometimes, the employee may not know what items are missing from a section of a shelf. The employee therefore may not be able to stock the section with the appropriate item. The employee may be able to stock the section with the appropriate item, however restocking the section can consume additional time due to the employee having to figure out what item belongs in that section. This can cause a loss in sales because consumers may be unable to purchase that item until it is restocked in the section.

Inventory management can include not only restocking the sections of the shelves but also specifying shape and placement of stocked items. Inventory management can be required at different locations within a facility or within many locations of a supply network to precede a regular and planned course of production and stock of the items. The concept of inventory, stock or work-in-process has been extended from manufacturing systems to service businesses and. projects, by generalizing a definition to be "all work within the process of production—all work that is or has occurred prior to the completion of production." In the context of a manufacturing production system, inventory refers to all work that has occurred—raw materials, partially finished products, finished products prior to sale and departure from the manufacturing system. In the context of services, inventory refers to all work done prior to sale, including partially process.

Some inventory management can be performed with computer vision tasks. Computer vision tasks can include operations for acquiring, processing, analyzing and understanding digital images, and extraction of high-dimensional data from the real world in order to produce numerical or symbolic information, e.g. in the forms of decisions. Understanding in this context includes transformation of visual images (input of a retina) into descriptions of the world that make sense to processes and can elicit appropriate action. This image understanding can be seen as a disentangling of symbolic information from image data using models constructed with geometry, physics, statistics, and learning theory. The image data can take many forms, such as video sequences, views from multiple cameras, multi-dimensional data from a 3D scanner, or medical scanning device.

SUMMARY

The document generally describes systems, methods, and techniques for efficiently controlling a mechanically movable camera, such as a pan-tilt-zoom (PTZ) camera, so that it can perform minimal mechanical movements to capture an image of a target area with sufficient fidelity so that objects in the image, such as barcodes, can be positively identified using one or more image analysis techniques. For example, the disclosed technology can be used as part of an apparatus that uses a mechanically movable camera to identify specific products that have various stock conditions, such as out of stock conditions, on shelves in a store, distribution center, or other facility storing items (e.g., products). As part of such an apparatus, the mechanically movable camera may be dispatched to capture product identifiers, such as barcodes that are positioned on shelves adjacent to the corresponding products, where stock conditions are detected. However, the apparatus with the mechanically movable camera can, itself, be movable and positioned at variable distances and orientations relative to shelves (e.g., attached to movable cart), which may result in highly variable mechanical movements of the movable camera each time it is dispatched (e.g., larger pan and tilt movements to capture images when apparatus close to shelves, greater zoom movements to capture images when apparatus if further away from shelves). To maximize throughput and to minimize response time, especially when the position and orientation of the movable camera relative to target image capture locations is variable, the disclosed technology provides techniques for efficient movement control, image capture, and image analysis for such a mechanically movable camera—permitting for a minimum mechanical movement to be performed in order to capture an minimally sufficient image to perform the object identification, so that the movable camera can then be more quickly moved to capture images for other objects.

For example, the disclosed technology can efficiently utilize a high resolution PTZ camera to minimally and iteratively hone in on a location on the shelf where a product identifier is located. One or more other cameras can also be used. The camera can capture image data that can be analyzed to identify the product identifier and the associated out of stock item. If the product identifier cannot be identified from the image data, then the camera settings can be minimally and iteratively adjusted to capture new image data of the location of the product identifier. The camera can be continuously adjusted by minimal amounts until the product identifier is identifiable within the captured image data. Because of minimal changes to the camera settings, the camera settings can be quickly reset or readjusted to move onto identification of a product identifier at another out of stock shelf section. As a result, out of stock items can be quickly determined.

Stock levels of items on shelves can be identified with computer vision. This technology can include functionality to optically analyze inventory on shelves to determine whether something on the shelves is out of stock, including as part of an apparatus that mounts onto a cart or other existing device or apparatus that is transported along aisles in a store (e.g., by a store employee). Such an apparatus can include a camera system, including a PTZ camera and a low resolution camera, and as the apparatus is moved down the aisles, the shelves can be scanned by the camera system to identify out of stock conditions. The low resolution camera can capture low resolution images that are used by a controller at the apparatus to identify whether a threshold area in the images resembles shelf backing. Pixel-by-pixel segmentation can be used in this process. If there is the threshold area that looks like shelf backing, an out of stock condition can be identified. The controller can then instruct the high definition camera to train on and iteratively zoom in in small increments to the location (i.e., x, y location or region) identified from the low resolution images as having the out of stock condition. The small increments in iterative zooms can also be determined based on movement of the apparatus relative to the shelf (i.e., to accommodate for movement of the PTZ camera relative to the target location as the PTZ camera is moving to capture images of the target location). The high resolution camera can continue to incrementally zoom into the location until the product identifier is accurately captured. Processing can be performed with edge computing at the controller of the apparatus, rather than at a remote server/computer system. The apparatus can also interface with a server system to report real-time stock information.

Particular embodiments described herein include a method for identifying a product identifier, the method can include receiving, by an edge computing device, x and y coordinates for a location of an out of stock shelf section, in which the location of the out of stock shelf section can be determined by the edge computing device and based on identifying, from one or more low resolution images, that a back section of the out of stock shelf section includes a greater portion of the images than one or more products that are supposed to be in the out of stock shelf section, determining, by the edge computing device, a frame of reference based on the x and y coordinates for the location of the out of stock shelf section, the frame of reference including a location of a product identifier that corresponds to the out of stock shelf section, determining, by the edge computing device, incremental adjustments to a camera based on the frame of reference, instructing, by the edge computing device, the camera to adjust by the determined incremental adjustments, instructing, by the edge computing device, the camera to capture an image of the location of the product identifier that corresponds to the out of stock shelf section within the frame of reference, receiving, by the edge computing device, the captured image from the camera, performing, by the edge computing device, image analysis on the captured image to identify the product identifier that corresponds to the out of stock shelf section, determining, by the edge computing device, whether the product identifier is identifiable from the captured image based on performing the image analysis, in response to determining that the product identifier is not identifiable from the captured image, determining, by the edge computing device, one or more second incremental adjustments to the camera, the one or more second incremental adjustments focusing the camera on the location of the product identifier within the frame of reference, and in response to determining that the product identifier is identifiable from the captured image, instructing, by the edge computing device, the camera to reset to original camera settings.

In some implementations, the system can optionally include one or more of the following features. For example, the method can also include in response to determining that the product identifier is not identifiable from the captured image: receiving, by the edge computing device, location information of the camera, identifying, by the edge computing device, movement of the camera relative to the frame of reference based on the location information, and determining, by the edge computing device, the one or more second incremental adjustments to the previously adjusted camera based on the identified movement of the camera relative to the frame of reference. Determining the one or more second incremental adjustments can include determining incremental adjustments to the camera that were not previously made.

In some implementations, the location information can include at least one of a speed at which the camera is moving, a direction of movement of the camera, and image data of the camera as the camera moves relative to the out of stock shelf section. Moreover, identifying movement of the camera based on the location information can include receiving, by the edge computing device, the image data of the camera as the camera moves relative to the out of stock shelf section, identifying, by the edge computing device, a reference point in the image data, and determining, by the edge computing device, movement of the camera relative to the reference point in the image data. The method can also include translating the frame of reference based on the identified movement of the camera relative to the reference point, in which translating the frame of reference can include aligning a field of view of the camera within the frame of reference.

As another example, determining, by the edge computing device, the frame of reference further can include translating the x and y coordinates into a reference point for the camera, in which the reference point can include the location of the product identifier that corresponds to the out of stock shelf section. As yet another example, determining, by the edge computing device, the incremental adjustments to the camera can include at least one of: panning the camera in a first direction, tilting the camera in a second direction, and zooming the camera in a third direction. The first, second, and third directions can be relative to the location of the product identifier within the frame of reference. Moreover, the incremental adjustments can be within a threshold range to minimize movement of the camera. The incremental adjustments can also be predetermined threshold values to minimize movement of the PTZ camera. In some implementations, the product identifier can be a one dimensional (1D) barcode, two dimensional (2D) barcode, SKU, QR code, or product label.

Moreover, the method can include in response to determining that the product identifier is identifiable from the captured image, storing, by the edge computing device, the captured image in a data store. The method may also include identifying, by the edge computing device, a product corresponding to the product identifier based on the captured image, retrieving, by the edge computing device, product information that is associated with the identified product from the data store, and transmitting, by the edge computing device, the product information to a user computing device for output at a display of the user computing device. The product information can include a name of the product, a description of the product, and stocking conditions of the product. The camera can be a pan-tilt-zoom (PTZ) camera.

In some implementations, the method can include predicting, by the edge computing device and at a first time, a location of the camera relative to the out of stock shelf section, determining, by the edge computing device, a field of view of the camera at the predicted location, determining, by the edge computing device, incremental adjustments to the camera that align the field of view of the camera with the frame of reference, and transmitting, by the edge computing device, the incremental adjustments to the camera for execution at a second time, the second time being later than the first time. Sometimes, the second time can be a time at which the camera is at the predicted location. Sometimes, the second time can be a threshold range of time before the camera is at the predicted location.

One or more embodiments described herein can include an apparatus for identifying a product identifier in an environment, the apparatus including: a camera that can capture images of an environment while the apparatus is moving in the environment and an edge computing device in data communication with the camera. The edge computing device can include processors that can perform operations including: receiving x and y coordinates for a location of an out of stock shelf section, the location of the out of stock shelf section being determined by the edge computing device and based on identifying, from one or more low resolution images, that a back section of the out of stock shelf section comprises a greater portion of the images than one or more products that are supposed to be in the out of stock shelf section, determining a frame of reference based on the x and y coordinates for the location of the out of stock shelf section, the frame of reference including a location of a product identifier that corresponds to the out of stock shelf section, determining incremental adjustments to the camera based on the frame of reference, instructing the camera to adjust by the determined incremental adjustments, instructing the camera to capture an image of the location of the product identifier that corresponds to the out of stock shelf section within the frame of reference, receiving the captured image from the camera, performing image analysis on the captured image to identify the product identifier that corresponds to the out of stock shelf section, determining whether the product identifier is identifiable from the captured image based on performing the image analysis, in response to determining that the product identifier is not identifiable from the captured image, determining one or more second incremental adjustments to the camera, the one or more second incremental adjustments focusing the camera on the location of the product identifier within the frame of reference, and in response to determining that the product identifier is identifiable from the captured image, instructing the camera to reset to original camera settings.

The embodiments described herein can include any of the abovementioned features. Moreover, the embodiments may optionally include the following features. For example, the operations further can include, in response to determining that the product identifier is not identifiable from the captured image: receiving location information of the camera, identifying movement of the camera relative to the frame of reference based on the location information, and determining the one or more second incremental adjustments to the previously adjusted camera based on the identified movement of the camera relative to the frame of reference.

The devices, system, and techniques described herein may provide one or more of the following advantages. For example, the camera can perform minimal amounts of work to capture an image of the product identifier. The camera settings can be incrementally modified to perform iterative zoom analysis on a particular field of view. Minimizing an amount of movement of components of the camera can be advantageous to ensure the camera can be quickly adjusted to focus on the particular field of view to capture an image of the product identifier. The product identifier identification process can be performed much quicker with edge computing at the apparatus. Moreover, minimizing an amount of movement of the camera can be advantageous to ensure the camera can be quickly adjusted to focus on a different field of view and a different out of stock condition. The camera can require less time to readjust for subsequent identifications, thereby reducing an amount of time needed to identify product identifiers.

As another example, the disclosed technology can be performed with edge computing, which can use less processing power and result in faster identification of product identifiers. Since small incremental adjustments to the camera can be quickly determined with edge computing, the camera can more quickly adjust and capture images of the field of view having the product identifier. Moreover, the apparatus described herein can more quickly perform image analysis techniques on the images to identify the product identifier. The apparatus can also more quickly determine additional incremental adjustments to the camera settings. The disclosed technology can therefore provide for fast and more efficient image processing techniques and camera adjustments. Edge computing can also be advantageous to avoid clogging network bandwidth, increase efficiency, and use less RAM and processing power. The executable for image processing can also be small in size and more easily deployable at the apparatus.

As yet another example, the apparatus described herein can be built on top of and integrated with existing in-store processes. The apparatus may not be an autonomous standalone robot, so it can be incorporated into and used with existing devices in the store, such as a human-pushed cart. The apparatus may not be obtrusive like a robot, which can block aisles or create obstacles for shoppers in the aisles. Moreover, as mentioned, processing can be performed at the apparatus itself with edge computing, which can avoid clogging network bandwidth, increase efficiency, and use less RAM and processing power.

Moreover, processing can be performed at the camera, thereby optimizing network and computer resources to more efficiently glean insight about stock conditions in the store. For example, the camera can include an image sensor and a region of interest module. The region of interest module can be configured to select a portion of a FOV of the image sensor which includes a product identifier (e.g., a region of interest). When an image is captured by the image sensor, only the selected portion of the image, rather than the entire image, can be transmitted to the edge computing device for further processing. Transmitting only the portion of the image to the edge computing device can be advantageous to avoid clogging network bandwidth and to reduce an amount of processing that may otherwise be performed at the edge computing device. Similarly, in some implementations, data specific to products that have been identified as out of stock with high confidence can be transmitted to the edge computing device and other computing systems, which may further avoid clogging network bandwidth and improve overall processing efficiency.

The details of one or more implementations are set forth in the accompanying drawings and the description below. Other features and advantages will be apparent from the description and drawings, and from the claims.

BRIEF DESCRIPTION OF THE DRAWINGS

FIGS. 4A-B is a flowchart of a process for iteratively scanning the product identifier.

FIG. 5 is a flowchart of a process for determining a location of a camera used for iteratively scanning the product identifier.

Like reference symbols in the various drawings indicate like elements.

DETAILED DESCRIPTION OF ILLUSTRATIVE EMBODIMENTS

This document generally relates to a control algorithm, techniques, processes, methods, and systems for efficiently controlling a mechanically movable camera, such as a high resolution pan-tilt-zoom (PTZ) camera, to identify product identifiers associated with out of stock conditions of shelves. More specifically, the disclosed technology can provide for incremental, minimal camera adjustments that ensure the camera can capture image data of the product identifier with minimum movement. The incremental camera adjustments can also ensure that the camera can more be more quickly reset or adjusted to different settings to capture image data of another product identifier. As a result, there can be minimal downtime or lag time to reposition or reset the camera in between scans.

Figure 1:
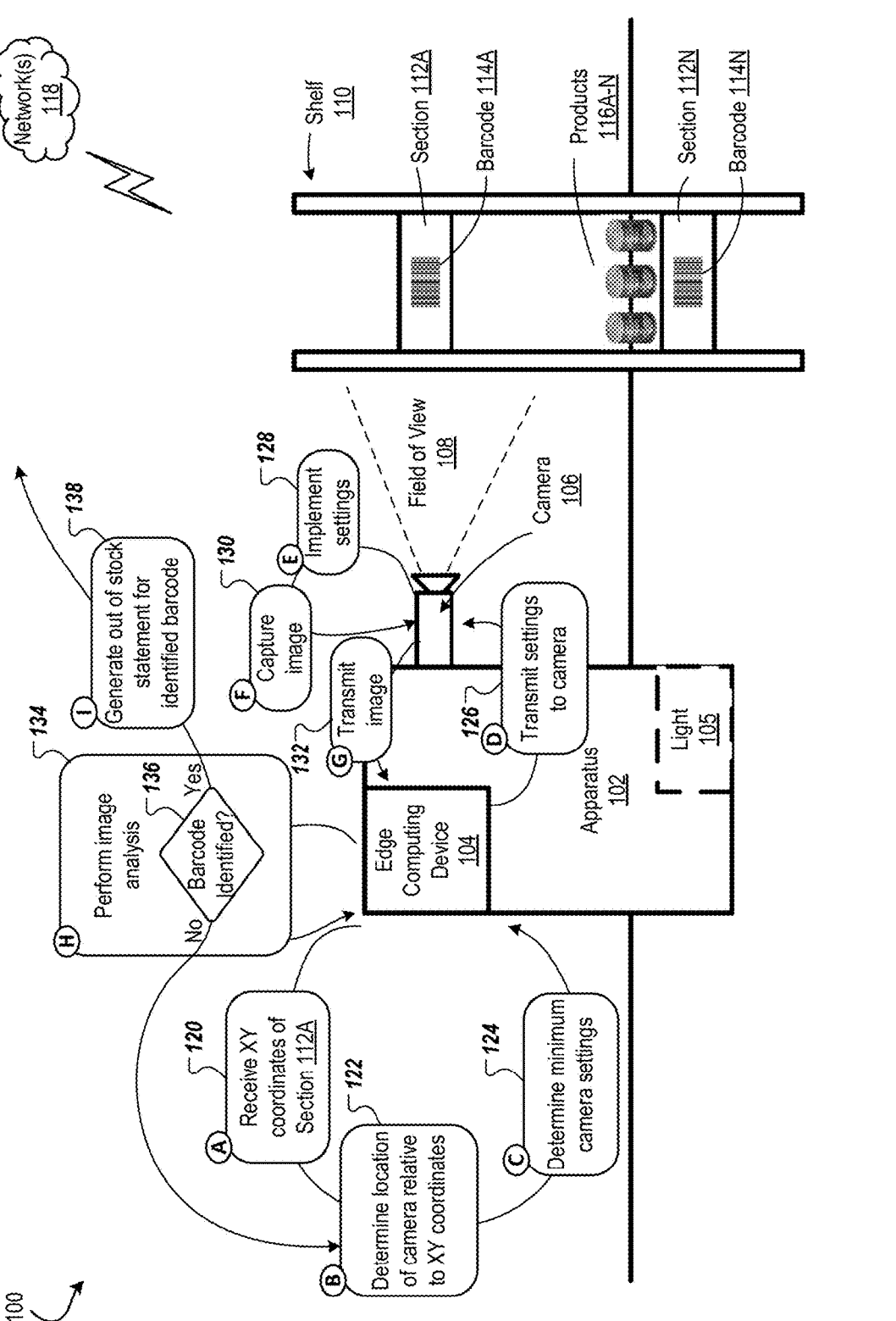
FIG. 1 is a conceptual diagram of a system for iteratively scanning a product identifier.

Referring to the figures, FIG. 1 is a conceptual diagram of a system 100 for iteratively scanning a product identifier (e.g., barcode). The system 100 can be a store, such as a grocery store, or any other facility that stores items such as inventory, goods, and products. The system 100 can include a shelf 110 having sections 112A-N. The system 100 can include a plurality of shelves having multiple sections. The shelves, for example, can be arranged into aisles. Users, such as shoppers and employees, can move up and down the aisles and pick products off the shelves.

In the example system 100, the section 112N of the shelf 110 contains products 116A-N. The section 112A of the shelf 110 is empty because it does not have any products. As described further in reference to FIGS. 6-9, the section 112A can be identified as having an out of stock condition since no products are currently located therein.

Moreover, each of the sections 112A-N can include a product identifier, such as barcodes 114A-N. In some implementations, the product identifier can be any other identification tags, such as RFID, SKUs, etc. Each of the barcodes 114A-N can correspond to a type of product or item to be stored at each of the sections 112A-N. For example, the barcode 114N can be a product identifier for the particular products 116A-N currently stored at the section 112N. When scanned, the barcode 114N can identify the particular products 116A-N. For example, scanning the barcode 114N can include associating the barcode 114N with a profile of the products 116A-N. The profile can include information about the products 116A-N, such as their name, price, type, description, etc.

In the example system 100 depicted, the barcode 114A can be a product identifier associated with a particular product that should be stored at the section 112A but currently is not there. As described herein, section 112A can have an out of stock condition since the section 112A is empty (e.g., no products are currently located at the section 112A). Since the section 112A is designated as having an out of stock condition, the techniques and apparatus described herein can be used to determine what product is supposed to fill the out of stock condition.

Thus, the barcodes 114A-N can be detected and when out of stock conditions are identified for one or more of the sections 112A-N of the shelf 110. The barcodes 114A-N can be detected by an apparatus 102, which can include an edge computing device 104 and a camera 106. The apparatus 102, edge computing device 104, and the camera 106 can be in communication (e.g., wired and/or wireless) via network(s) 118. The apparatus 102 can be a device that is capable of being moved around the environment 101, as described further below in reference to FIGS. 6-9. For example, the apparatus 102 can be attached to a mobile cart that can be moved by a user, such as an employee, up and down aisles of the store.

The edge computing device 104 can be configured to perform one or more operations described herein. For example, image processing can be performed by the edge computing device 104. The edge computing device 104 can also determine incremental adjustments that can be made to the camera 106.

When the out of stock condition is identified for the section 112A (e.g., refer to FIGS. 6-9), the edge computing device 104 can determine x and y coordinates of the section 112A (step A, 120). The x and y coordinates can represent a frame of reference (FOR) that includes the section 112A and the barcode 114A. The edge computing device 104 can determine a location of the camera 106 relative to the x and y coordinates of the section 112A (step B, 122). Determining the location of the camera 106 can include translating the x and y coordinates as the apparatus 102 is being moved in the system 100. After all, the apparatus 102 can be continuously moving in the system 100 while the camera 106 is capturing images of the barcode 114A or otherwise scanning the shelf 110 or other shelves in the aisle. By determining the location of the camera 106 relative to the x and y coordinates of the section 112A, the edge computing device 104 can determine appropriate and minimal adjustments to the camera 106 settings while maintaining a field of view 108 that aligns with the frame of reference.

Thus, the edge computing device 104 can determine minimum camera settings for the camera 106 (step C, 124). The minimal camera settings can include incremental adjustments to pan, tilt, zoom, focus, shutter speed, sensitivity, and/or aperture of the camera 106. Where the camera 106 is a PTZ camera, the minimal camera settings can include adjustments to pan, tilt, and/or zoom motors of the camera 106. Where the camera 106 is a stationary camera, the minimal camera settings can include adjustments to one or more of zoom, focus, shutter speed, sensitivity, and/or aperture. The edge computing device 104 can determine any combination of camera settings that can be made.

The edge computing device 104 can also determine lighting settings for a light 105 of the apparatus 102. In some implementations, the apparatus 102 can optionally include the light 105. Although the light 105 is depicted in FIG. 1 at a base of the apparatus 102, the light 105 can be configured at any region of the apparatus 102. For example, the light 105 can be attached to an upper corner of the apparatus 102. The light 105 can be part of the camera 106. The light 105 can also be attached to a vertical pole that extends from a top or side surface of the apparatus 102. The light 105 can be controlled by the edge computing device 104. In other words, the edge computing device 104 can determine lighting settings in step C (124). The edge computing device 104 can determine that the shelf section 112A is in shadows and therefore the barcode 114A may not be clearly captured by the camera 106. Thus, the edge computing device 104 can determine that the light 105 should be turned on. The edge computing device 104 can then generate instructions that, once transmitted to the light 105, cause the light 105 to turn on.

The minimum camera settings described above can be used to capture an image of the barcode 114A. As described herein, if the barcode 114A cannot be accurately identified from the image, then additional camera setting changes can be determined by the edge computing device 104 and then applied to the camera 106 (e.g., and/or additional lighting settings can be determined and applied to the light 105). Determining minimum setting changes can be advantageous to ensure minimum motor movement of the camera 106 while the apparatus 102 is moving within the environment and/or while the camera 106 is capturing images of the barcode 114A. Minimum motor movement can also be advantageous such that the camera 106 can quickly adjust its field of view 108 to one or more different FORs. For example, upon accurate detection of the barcode 114A, the camera 106 can be more quickly reset to origin settings and/or another FOR. The camera 106 can then be more readily available to begin the image capturing process for another product identifier representing an out of stock condition.

Still referring to FIG. 1, the edge computing device 104 can transmit the minimum settings to the camera 106 (step D, 126). The camera 106 can implement the settings (step E, 128). Implementing the settings can include instructing one or more motors to adjust the pan setting of the camera 106 by a predetermined amount, tilt the camera 106 by a predetermined amount, and/or zoom in to the FOR by a predetermined amount. Implementing the settings can also include focusing on a particular region in the FOV 108, adjusting an aperture of the camera 106, adjusting a shutter speed of the camera 106, and/or adjusting sensitivity to light of the camera 106. Once the settings are implemented, the camera 106 can capture an image within the camera 106's FOV 108 (step F, 130). The camera 106 can transmit the image to the edge computing device 104 (step G, 132) for processing.

Figure 3:
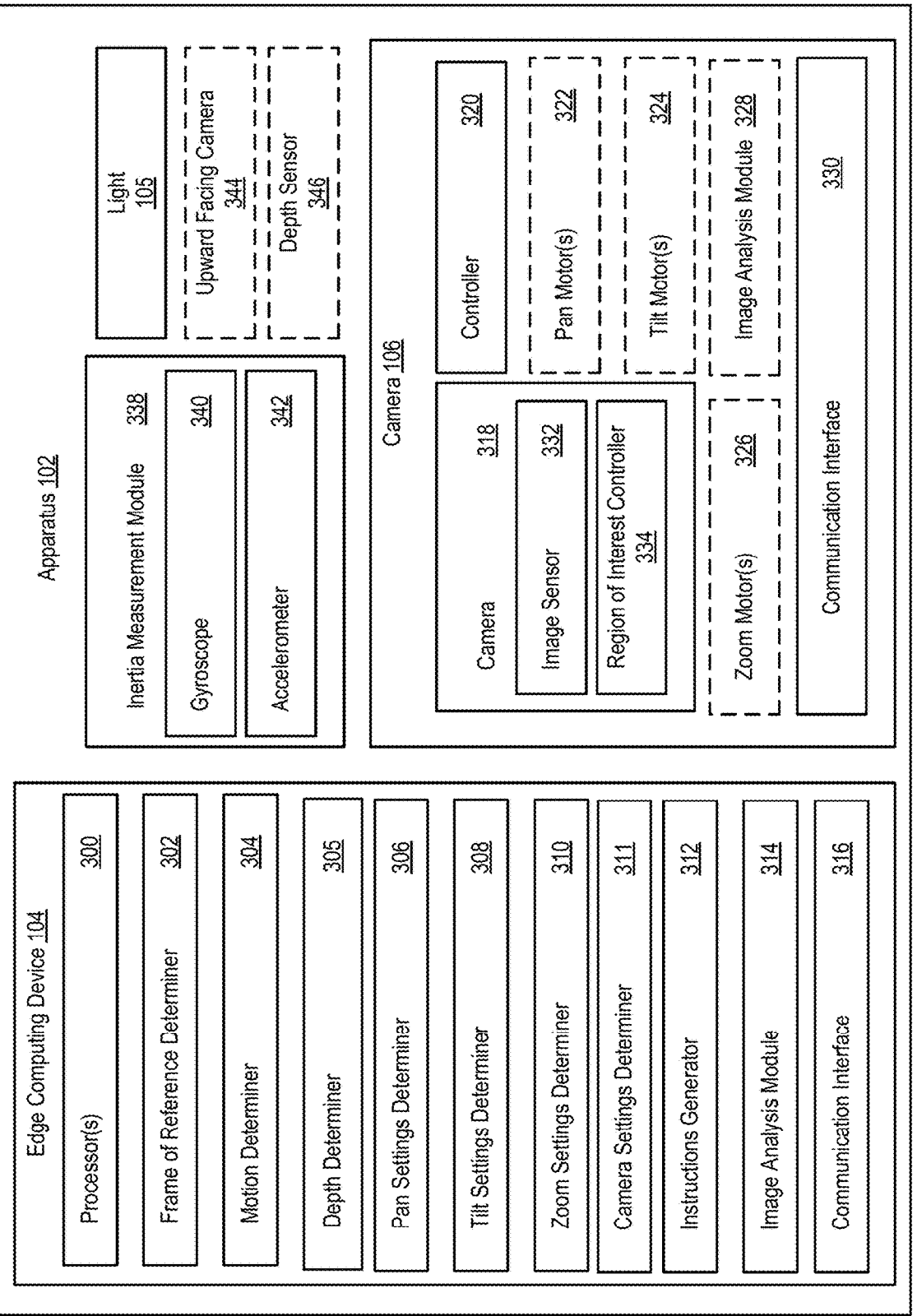
FIG. 3 is a system diagram of components of a system that can be used to iteratively scan the product identifier.

Sometimes, as described in reference to FIG. 3, the entire image may not be transmitted to the edge computing device 104. Rather, a portion of the image can be transmitted. The camera 106 can include a region of interest (ROI) module that can determine a region of the FOV 108 that includes the barcode 114A. When the image is captured by the camera 106 in step F (130), the camera 106 can then select a portion of the image that includes the barcode 114A (e.g., the region of interest), and transmit just that portion of the image to the edge computing device 104. This can be advantageous to reduce clogging of network bandwidth. This can also be advantageous to reduce computing resources that otherwise would be used at the edge computing device 104 to process the entire image and identify the portion of the image having the barcode 114A.

The edge computing device 104 can perform image analysis on the received image (step H, 134). Image analysis can include object detection techniques or other similar methods for detecting features within the image. Thus, the edge computing device 104 can perform image analysis to determine whether the barcode 114A is positively identified within the image from the current mechanical settings of the camera 106 (136). If the edge computing device 104 can accurately identify the barcode 114A, then the edge computing device 104 can generate a notification about the section 112A (step I, 138). The notification can indicate that the section 112A is likely out of stock. The notification can also include an image of the detected barcode 114A and/or product information associated with the detected barcode 114A. A user, such as a store employee, can then view the notification to identify what product should be stored at the section 112A. The user can proceed to stock the section 112A with the product.

If the edge computing device 104 is unable to positively identify the barcode 114A in the image taken using the current settings for camera 106 ("no" branch from 136), such as if the image is taken from too far away (e.g., the PTZ camera 106 is too zoomed out) the camera 106 is panned or tilted in an undesired direction or orientation relative to FOR, and/or the lighting is so low that the image is blurry or grainy, then the edge computing device 104 can determine an updated location of the camera 106 relative to the x and y coordinates (step B, 122) and determine new incremental minimum camera settings (step C, 124). Items (step B, 122)-(step H, 134) in FIG. 1 can be repeated until the edge computing device 104 accurately identifies the barcode 114A.

Moreover, in some implementations, in step H (134), the edge computing device 104 may also perform computer vision and/or OCR techniques to identify the product in the image data.

Figure 2:
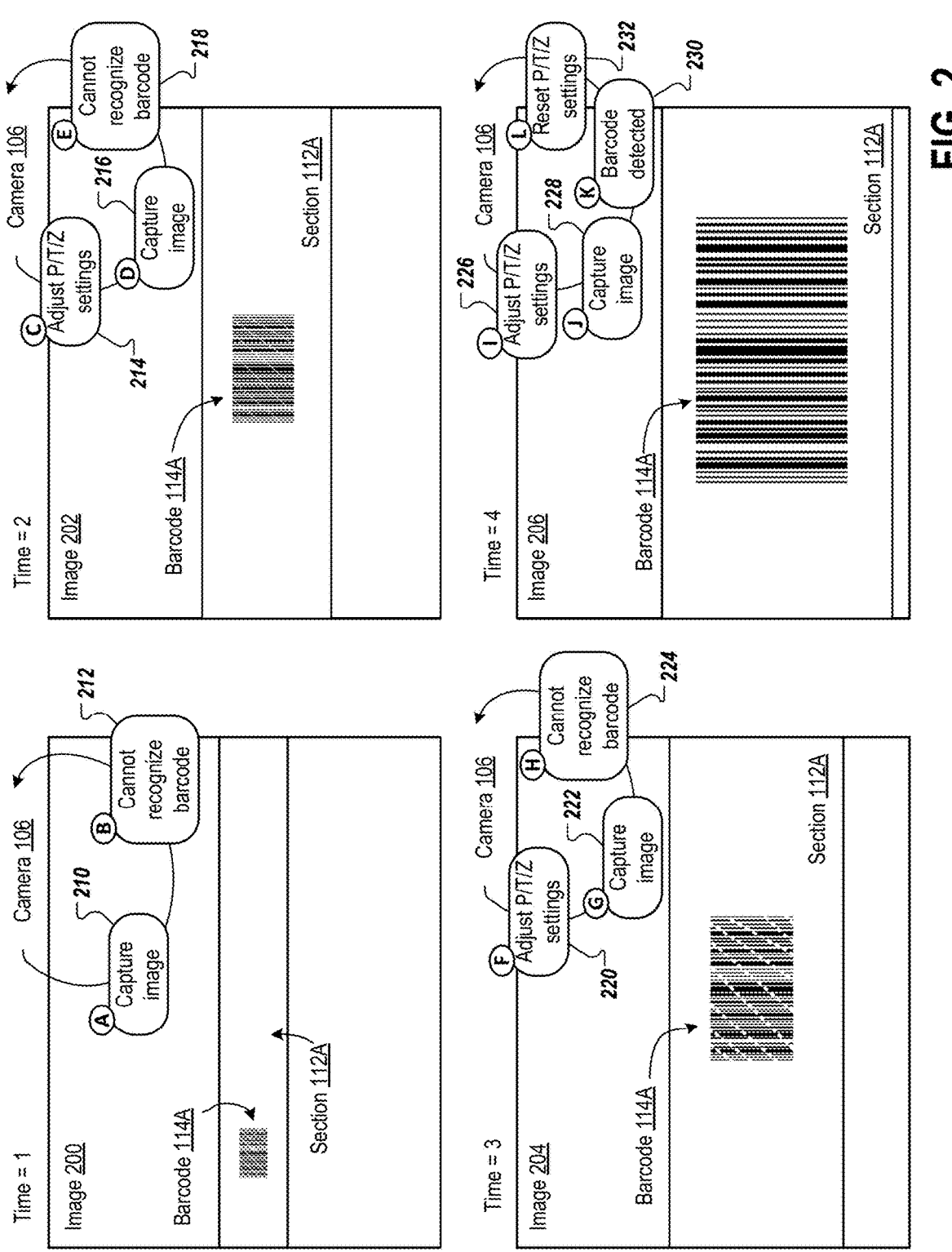
FIG. 2 depicts iterative scanning of the product identifier of FIG. 1.

FIG. 2 depicts iterative scanning of the product identifier (e.g., barcode 114A) of FIG. 1. In this example, the camera 106 can be a PTZ camera having motors to control pan, tilt, and zoom features of the camera 106. Images 200, 202, 204, and 206 are captured by the camera 106 at time=1, time=2, time=3, and time=4, respectively. Each of the times can be spaced out at predetermined time intervals (e.g., every 5 seconds, every second, etc.). The predetermined time intervals can be determined based on a speed at which the camera 106 is being moved relative to a location of a product identifier that needs to be identified. The predetermined time intervals can also be a constant time value that is determined before any product identifier identification process described herein.

As demonstrated, in each of the images 200, 202, 204, 206, the camera 106 settings have been incrementally adjusted to eventually capture a clear image of the barcode 114A associated with the section 112A. It should be noted that in some implementations, a clear image of the barcode 114A can be captured in fewer than four images. In some implementations, a clear image of the barcode 114A can be captured in more than four images.

At time=1, the camera 106 captures the image 200 (step A, 210). At this first time, the camera 106 can be set to origin settings. In other words, the pan, tilt, and/or zoom settings of the camera 106 can be set to original directions, orientations, and zooms before any adjustments are made. In some implementations, the camera 106 can capture the image 200 immediately after successfully identifying another barcode or product identifier. As described throughout this disclosure, the camera 106 can be reset to origin settings (e.g., zoomed out, no pan, no tilt) before the image 200 is captured. In some implementations, since the settings are minimally and incrementally adjusted, the image 200 can also be captured when the camera 106 is still set to settings that were used to successfully identify the prior barcode. As described herein, an advantage of minimal, incremental changes to pan, tilt, and/or zoom settings is that the camera 106 is capable of quickly adjusting and resetting to scan the barcode 114A and/or other product identifiers.

Still referring to time=1, the camera 106 may determine that it cannot recognize the barcode 114A (step B, 212). In other words and as described herein, the edge computing device 104 can perform image analysis to try to identify the barcode 114A (e.g., refer to FIG. 1). If the edge computing device 104 is unable to identify the barcode 114A in the image 200, the edge computing device 104 can transmit a notification to the camera 106. As described further, the notification can also include instructions for adjusting the PTZ camera settings to capture another image of the barcode 114A.

Since the barcode 114A is not recognizable from the image 200, the pan, tilt, and/or zoom settings of the camera 106 can be adjusted at time=2 (step C, 214). The edge computing device 104 can determine minimal, incremental adjustments to the settings of the camera 106 that focus the camera 106's field of view on a frame of reference that includes the barcode 114A (e.g., refer to FIG. 1). The camera 106 can also be moving at time=2. Thus, the edge computing device 104 can determine a location of the camera 106 relative to the location of the barcode 114A. Such location information can be used by the edge computing device 104 to determine the minimal, incremental camera 106 setting adjustments. The camera 106 can accordingly execute the setting(s) adjustments by causing one or more motors to move to the new settings. Since the setting adjustments are minimal and incremental, the camera 106 can quickly readjust to be ready to capture another image of the barcode 114A.

Once adjusted to the new settings, the camera 106 can capture image 202 (step D, 216). As shown in the image 202, the camera 106 has panned more to the right such that the barcode 114A is centered in the camera 106's field of view. The camera 106 has also zoomed into a location where the barcode 114A is located. Although the camera 106 has been adjusted to capture a better image of the barcode 114A in comparison to the image 200, the barcode 114A may still not be identifiable from the image 202. Image analysis and barcode detection techniques can be performed again. The edge computing device 104 can notify the camera 106 that the barcode 114A cannot be recognized in the image 202 (step E, 218).

Since the barcode 114A is not recognizable from the image 202, the pan, tilt, and/or zoom settings of the camera 106 can be adjusted again at time=3 (step F, 220). In some implementations, the edge computing device 104 can determine appropriate settings adjustments at time=3. In some implementations, the edge computing device 104 can determine appropriate settings adjustments at time=2 such that at time=3, the camera 106 can already be set to the new settings adjustments and ready to capture image 204.

The camera 106 can capture image 204 once the settings are adjusted (step G, 222). As shown in the image 204, the camera 106 has minimally zoomed into the location where the barcode 114A is located on the section 112A still. One or more of the pan and tilt settings of the camera 106 may not have been adjusted. For example, the edge computing device 104 may determine that in the image 202, the pan and tilt settings of the camera 106 were preferred but that only the zoom setting had to be adjusted. Image analysis and barcode detection techniques can be performed on the image 204. As shown in this example, the barcode 114A can still appear blurry, pixelated, or otherwise unable of being identified. Thus, the edge computing device 104 can determine that the barcode 114A cannot be recognized in the image 204 (step H, 224). The edge computing device 104 can notify camera 106.

Accordingly, since the barcode 114A is not recognizable from the image 204, the pan, tilt, and/or zoom settings of the camera 106 can be adjusted again at time=4 (step I, 226). As described above, the edge computing device 104 can determine that the pan and tilt settings of the camera 106 do not need to be adjusted. Rather, the edge computing device 104 can determine a minimal and incremental adjustment for just the zoom settings of the PTZ camera 106. Once the zoom is adjusted, the camera 106 can capture image 206 (step J, 228). As shown in the image 206, the camera 106 has minimally zoomed into the location where the barcode 114A is located on the section 112A. Image analysis and barcode detection techniques can be performed on the image 206. In this example, at time=4, the edge computing device 104 determines that the barcode 114A is detected in the image 206 (step K, 230). The image 206 is a clear capture of the barcode 114A, such that the barcode 114A can be scanned and a product associated with the barcode 114A can be identified.

Once the barcode 114A is identified, the pan, tilt, and/or zoom settings of the camera 106 can be reset (step L, 232). The edge computing device 104 can transmit instructions to the camera 106 that, when executed, cause one or more motors of the camera 106 to readjust to origin settings. Resetting the camera 106 settings can include zooming out all the way, returning the pan setting to an original directional view, and returning the tilt setting to an original angle. As described herein, because minimal adjustments are made to the pan, tilt, and/or zoom settings of the camera 106 while trying to identify the barcode 114A, the camera 106 can be more readily able to reset with minimal motor movement once the barcode 114A is in fact identified. Thus, the camera 106 can be ready to detect other product identifiers with minimal lag or down time between identification sessions. In some implementations, instead of resetting the pan, tilt, and/or zoom settings, the settings can be adjusted to new settings for detecting a new product identifier. The process described in FIG. 2 can then be repeated for the new product identifier and any subsequent product identifiers that need to be identified.

Still referring to FIG. 2, the image 206 can be saved in a data store (e.g., in memory, cloud storage, remote data store, or database). The image 206 can then be used to identify products associated with the barcode 114A. In some implementations, each of the images 200, 202, and 204 can be discarded at each of the times=1, 2, and 3 when the edge computing device 104 determines that the barcode 114A is not recognizable (at (B), (E), and (H)). Thus, processing and computing power at the edge computing device 104 can remain light and available for fast image analysis, barcode detection, and camera 106 adjustment.

In some implementations, the camera 106 settings from the time at which the barcode 114A is accurately identified can be saved in the remote data store. These settings can then be used to train the edge computing device 104 to more accurately determine adjustments to the camera 106 settings for future barcode detections/scans. As a result of such training, fewer adjustments to the camera 106 settings can be made in the future to accurately detect subsequent barcodes. Fewer adjustments can be advantageous to ensure that the camera 106 can be quickly reset to origin settings with minimal motor movement and thus ready to capture images of other product identifiers that need to be identified.

In some implementations, the edge computing device 104 can determine incremental adjustments to the camera 106 settings based on predetermined threshold values. For example, once the edge computing device 104 determines that the camera 106 needs to zoom in a little more, the edge computing device 104 can transmit a predetermined incremental amount of adjustment to make to the camera 106. The predetermined incremental amount of adjustment can require zooming in by 5%. Thus, the camera 106 can zoom into it's field of view by 5%. Any subsequent determinations that the camera 106 settings need to be adjusted can also require a 5% change in the current settings (e.g., zoom out by 5%). The predetermined incremental amount of adjustment can also be different values, such as an amount of degrees to tilt or pan and/or a focal length to adjust to. Determining adjustments to the camera 106 based on predetermined threshold ranges or values can be advantageous to reduce processing power. Image analysis can be performed faster. The edge computing device 104 can more quickly determine whether the camera 106 needs to be adjusted. The edge computing device 104 may not have to use processing power to determine how much the camera 106 needs to be adjusted. Rather, the edge computing device 104 can merely transmit a notification to the camera 106 instructing one or more of the pan, tilt, and zoom settings to be adjusted by the predetermined threshold range or value.

In some implementations, the edge computing device 104 can determine incremental adjustments to the camera 106 in real-time after determining that a product identifier cannot be identified from a captured image. The edge computing device 104 can determine the incremental adjustments based on movement of the camera 106 relative to the product identifier location. The incremental adjustments can also be determined within predetermined threshold ranges such that the adjustments remain incremental and minimal enough to minimize motor movement of the camera 106. Determining incremental adjustments in real-time can be advantageous to identify the product identifier in fewer image captures. As a result, the edge computing device 104 can be more efficient in identifying the product identifier and moving on to identifying other product identifiers, especially if the other product identifiers are nearby the identified product identifier and the camera 106 is continuously moving away from locations of the other product identifiers.

Although FIG. 2 is described in reference to a PTZ camera, other types of the camera 106 can similarly be adjusted with incremental adjustments to accurately detect the barcode 114A. For example, the camera 106 can be a stationary camera, a moving camera that does not have pan, tilt, or zoom motors, or any other type of camera. Instead of adjusting P/T/Z settings of the PTZ camera in steps C (214), F (220), and I (226), the camera 106 can adjust one or more other camera settings. The camera 106 can also adjust any combination of camera settings. For example, the camera 106 can adjust pan, tilt, zoom, focus, shutter speed, aperture, and/or sensitivity. At time=2, the camera 106 can adjust a zoom setting of the camera in step C (214). At time=3, the camera 106 can adjust shutter speed in step F (220). Moreover, at time=4, the camera 106 can adjust zoom and sensitivity to light in step I (226) in order to detect the barcode in step K (230). One or more other setting adjustments and/or combinations of setting adjustments are possible. Sometimes, in steps C (214), F (220), and I (226), the camera 106 can adjust other settings, such as lighting. The camera 106 can also adjust image sensors of the camera 106 to determine whether to capture portions of the camera 106's FOV (e.g., regions of interest) or an entirety of the camera 106's FOV, and what portions of the camera 106's FOV to capture.

FIG. 3 is a system diagram of components of a system that can be used to iteratively scan the product identifier. As described herein, the edge computing device 104 and the camera 106 can be configured to be part of the apparatus 102 (e.g., refer to the FIGS. 6-9 for further discussion on the apparatus). The edge computing device 104, the camera 106, and/or the apparatus 102 can communicate via the network(s) 118. The apparatus 102 can also include a light 105, an inertia measurement module 338, an optional upward facing camera 344, and an optional depth sensor 344.

The light 105 can be selectively actuated and controlled by the edge computing device 104. For example, based on an image captured by the camera 106 being too dark, grainy, and/or blurry, the edge computing device 104 can determine that the light 105 should be actuated to illuminate an area captured by the camera 106. The light 105 can be an LED light. The light 105 can also be an infrared light, a red light, or one or more other types of lights that the camera 106 is sensitive to. Actuating the light 105 can be advantageous when the camera 106 is moving at a speed that causes the captured images to be blurry and/or grainy.

The inertia measurement module 338 can be configured to determine orientation, speed, direction of gravity, and direction of movement relative to the direction of gravity for the apparatus 102. The inertia measurement module 338 can include a gyroscope 340 and an accelerometer 342 to detect movement of the apparatus 102 and make the abovementioned determinations.

The upward facing camera 344 can be attached to the apparatus 102 and pointed upwards to train on a ceiling of an environment, such as a retail store. The upward facing camera 344 can determine a location of the apparatus 102 in the environment based on what lights are detected in the ceiling of the environment by the camera 344. For example, the upward facing camera 344 can detect lights that are emitted from the ceiling of the environment and can identify those lights in a lookup table that associates the lights with locations in the environment. The upward facing camera 344 can then triangulate a location of the apparatus 102 based on correlating the locations for the lights that are identified via the lookup table. Sometimes, the apparatus 102 may not have the upward facing camera 344 and can instead employ a different location positioning system to determine a current location of the apparatus 102 in the environment. For example, the apparatus 102 can utilize Bluetooth beacons or other global positioning devices and signals.

The depth sensor 346 can be configured to detect signals or other data that can be used by the edge computing device 104 to determine a depth or distance between the apparatus 102 and a particular shelf, barcode, or other region of interest (ROI). The depth sensor 346 can, for example, be a stereoscopic camera. The depth sensor 346 can also use LiDAR and/or infrared sensors to detect depth or distance between the apparatus 102 and a particular shelf, barcode, or ROI.

The edge computing device 104 can include processor(s) 300, frame of reference determiner 302, motion determiner 304, depth determiner 305, pan settings determiner 306, tilt settings determiner 308, zoom settings determiner 310, camera settings determiner 311, instructions generator 312, image analysis module 314, and communication interface 316. The processor(s) 300 can be configured to perform one or more of the operations described herein in reference to the edge computing device 104.

The frame of reference determiner 302 can be configured to determine a frame of reference (FOR) in which the camera 106 should be looking at/directed to, regardless of how much the camera 106 moves around an environment relative to that frame. The FOR can encompass a location of a product identifier that needs to be identified. In some implementations, the FOR can be large enough to also encompass a shelf and/or section of the shelf. The FOR can be large because the FOR can be based on one or more image data captured by low resolution cameras that are configured to the apparatus 102 (e.g., refer to FIGS. 6-9). The low resolution cameras can capture image data including the shelf and the section of the shelf that is determined to have an out of stock condition. The FOR can then be the entire location captured in the image data.

Any adjustments to the settings of the camera 106 can be based on and relative to the FOR. In other words, the camera 106's field of view can always be aligned with the FOR. For example, the edge computing device 104 can receive x and y coordinates of a location in the environment where the barcode is located. The x and y coordinates can be translated into an FOR by the determiner 302. The edge computing device 304 can then determine adjustments to the camera 106 settings based on the FOR, thereby ensuring that the camera 106's field of view aligns with the FOR. Therefore, the edge computing device 104 can ensure that the camera 106 does not capture images of the environment that do not include the product identifier to be identified.

The motion determiner 304 can be configured to determine location information of the camera 106. In particular, the motion determiner 304 can determine movement of the camera 106 relative to the FOR. Accelerometer data and other data can be received from the inertia measurement module 338 and used to determine camera 106 movement. For example, as the apparatus 102, with the camera 106 attached thereto, moves around in the environment, motion data (e.g., speed in m/s) can be captured by the accelerometer 342 and transmitted to the motion determiner 304. Using that data, the determiner 304 can determine a speed at which the camera 106 is moving and/or a direction of the camera 106's movement. The edge computing device 104 can use less processing power to determine movement of the camera 106 by using the accelerometer data (e.g., and/or the gyroscope data). Therefore, it can be advantageous to determine speed and/or direction of movement using data that is detected or otherwise determined by the inertia measurement module 338.

The speed and/or direction of the camera 106 can also be transmitted to the frame of reference determiner 302. The determiner 302 can use the speed and/or direction of the camera 106 to identify where the camera 106 is located relative to the location of the product identifier (e.g., the FOR). The speed and/or direction of the camera 106 can also be used by one or more other components of the edge computing device 104 to determine minimal adjustments that can be made to the camera 106 settings so that the camera 106 can capture images of the product identifier within the FOR.

In some implementations, the motion determiner 304 can determine movement of the camera 106 using image analysis techniques. For example, the motion determiner 304 can receive still images or other image data (e.g., video) from the camera 106, low resolution cameras of the apparatus 102, and/or cameras placed throughout the environment. The motion determiner 304 can identify one or more reference points in the received images. Using the reference point(s), the motion determiner 304 can compare the received images to determine movement of the camera 106 relative to the reference point(s). The motion determiner 304 can also use triangulation techniques to identify location information of the camera 106 and movement of the camera 106 within the environment. Moreover, in some implementations, movement of the camera 106 can be determined using a motion prediction model that was trained using machine learning techniques. The motion prediction model can be a Kalman filter, which can receive position data as input and output movement data for the camera 106. One or more other techniques and data can also be used, including but not limited to point detection techniques, dense optical flow techniques (e.g., comparing every pixel instead of select pixels), accelerometer data, depth sensor data, and/or an indoor telemetry system, as described herein.

In some implementations, the motion determiner 304 can also predict when the camera 106 may be moving, in what direction the camera 106 may be moving, and at what speed the camera 106 may move. The movement of the camera 106 can be predicted in advance of actual movement of the camera 106 relative to the location of the product identifier. The movement of the camera 106 can be based on historic information about movement of the camera 106. The motion determiner 304 can also be trained, using one or more machine learning based algorithms and/or models, to better predict movement of the camera 106 relative to the location of the product identifier. The training can be based on historic information about the camera 106's movements and previous camera 106 setting adjustments that were determined based on movement (e.g., real-time determined and/or predicted) of the camera 106 relative to the location of the product identifier. Predicting the movement of the camera 106 in advance can be advantageous because the determiner 304 can use less processing power in real-time. That way, other components of the edge computing device 104 can use the available processing resources to more quickly perform image analysis techniques and determine whether the product identifier can be identified from the captured image(s). Overall, the edge computing device 104 can become more efficient and accurate in identifying product identifiers.

The depth determiner 305 can be configured to determine a depth or distance between the apparatus 102 (e.g., more specifically, the camera 106) and the region of interest (e.g., the barcode). The depth determiner 305 can receive data or other signals from the depth sensor 346 and use that data to determine how far away the apparatus 102 is from the region of interest. The depth determiner 305 can also determine depth or distance away based on data that is detected by and received from the inertia measurement module 338 and/or detected by and received from the upward facing camera 344. For example, using a combination of data include speed that the apparatus 102 is moving at, location of the apparatus 102 in the environment, and infrared signals detected in the environment, the depth determiner 305 can identify how far away the camera 106 is from the region of interest. Depth or distance away can then be used by the edge computing device 104 to determine appropriate setting adjustments to make to the camera 102.

The pan, tilt, and zoom settings determiners 306, 308, and 310, respectively, can determine minimal adjustments that can be made to the pan, tilt, and/or zoom settings of the camera 106. The determiners 306, 308, and 310 can receive at least one or more of (i) the FOR from the frame of reference determiner 302, (ii) the location information (e.g., speed, direction of movement, etc.) of the camera 106 from the motion determiner 304 and/or the depth determiner 305, and (iii) current pan, tilt, and zoom settings of the camera 106. Using the information (i)-(iii), one or more of the determiners 306, 308, and 310 can determine camera 106 setting adjustments that can maintain the camera 106's field of view within the FOR regardless of whether the camera 106 is moving in the environment relative to the location of the product identifier.

Moreover, the camera settings determiner 311 can be configured to similarly determine adjustments that can be made to other settings of the camera 106. For example, the camera settings determiner 311 can use any one or more of the information (i)-(iii) to determine setting adjustments for focus, aperture, shutter speed, and/or sensitivity of the camera 106. The camera settings determiner 311 can also determine one or more setting adjustments for the light 105, which can further be based on analysis of images that are captured by the camera 106 (e.g., whether the image analysis module 314 determines that the image is too grainy, blurry, dark, etc.).

As described herein (e.g., refer to FIG. 2), the minimal adjustments can be determined within threshold ranges so that the adjustments remain minimal and incremental to minimize motor movement. The minimal adjustments can also be predetermined threshold values that one or more of the pan, tilt, and/or zoom settings or other settings of the camera can be adjusted by at a given time. Thus, in some implementations, the determiners 306, 308, 310, and 311 can determine minimal adjustments within predetermined threshold ranges in real-time. In other implementations, the determiners 306, 308, 310, and 311 can select, in real-time, predetermined threshold values as the minimal adjustments that should be applied to the camera 106.

More particularly, the pan settings determiner 306 can determine a minimal adjustment of the camera 106's pan such that the camera 106 can capture the product identifier within the FOR. The determiner 306 can receive current pan settings of the camera 106. The current pan settings can be received from the camera 106. The current pan settings can also be stored in memory at the edge computing device 104 and accessed by the pan settings determiner 306. In some implementations, the determiner 306 can determine the current pan settings of the camera 106 in real-time. The current pan settings can be determined based on previously determined pan setting adjustments and/or pan motor information from the camera 106. The determiner 306 can also receive current location or movement information of the camera 106. Using the current location or movement information, the FOR, and the current pan settings, the determiner 306 can determine minimal adjustments to the pan settings of the camera 106 such that the camera 106's field of view aligns with the FOR and an image of the product identifier can be captured. The determiner 306 can be trained such that minimal adjustments are made to the pan settings that focus the camera 106 on a location in its field of view that includes the product identifier. In some implementations, the determiner 306 can also receive determined adjustment settings from the determiners 308, 310, and 311. The determiner 306 can make pan setting adjustments based off and relative to the adjustment settings determined by the determiners 308, 310, and 311.

The tilt settings determiner 308 can determine minimal adjustments of the camera 106's tilt settings such that the camera 106 can capture the product identifier within the FOR. The determiner 308 can receive current tilt settings of the camera 106 as described above in reference to the pan settings determiner 306. In some implementations, the determiner 308 can also determine the current tilt settings of the camera 106. The determiner 308 can then determine how much the camera 106's tilt settings can be adjusted. The tilt setting adjustments can also be determined based on the current location or movement information, the FOR, and determined pan and/or zoom settings. The determiner 308 can be trained such that minimal adjustments are made to the tilt settings that focus the camera 106 on a location in its field of view that includes the product identifier.

The zoom settings determiner 310 can determine a minimal adjustment of the camera 106's zoom settings such that the camera 106 can capture the product identifier within the FOR. The determiner 310 can receive and/or determine current zoom settings of the camera 106 as described above in reference to the pan and tilt settings determiners 306 and 308. The tilt setting adjustments can be determined based on the current zoom settings of the camera 106, the current location or movement information, the FOR, and determined pan and/or zoom settings. The determiner 308 can be trained such that minimal adjustments are made to the tilt settings that focus the camera 106 on a location in its field of view that includes the product identifier.

In some implementations, the determiners 306, 308, 310, and/or 311 can predict camera 106 settings before the camera 106 moves in the environment relative to the location of the product identifier. For example, the determiners 306, 308, 310, and 311 can be trained to predict ahead of time how the camera 106 should be adjusted instead of training in real-time as movement information is determined/received. The motion determiner 304 can therefore be trained to predict movement of the camera 106 based on historic movement information associated with the camera 106. The predicted movement information can be transmitted to the determiners 306, 308, 310, and 311 to then determine minimal settings adjustments for the camera 106.

Predicting and determining settings adjustments ahead of time can be advantageous to compensate for potential lag time in adjusting the camera 106 settings in real-time execution. If the setting adjustments based on a current location of the PTZ camera 106 are executed while the camera 106 is moving towards and away from the location of the product identifier, then new setting adjustments may be required to accommodate for a new current location of the camera 106 relative to the location of the product identifier. Thus, setting adjustments can be determined in advance of the camera 106 moving to a location relative to the product location so that, once the location relative to the product identifier is reached, the camera 106 can be ready to capture an image of the product identifier.

In some implementations, the determiners 306, 308, 310, and 311 can receive a projected location of the camera 106 at a particular time that is relative to the location of the product identifier. This information can be received from the motion determiner 304. The determiners 306, 308, 310, and 311 can then determine pan, tilt, zoom and/or other camera setting adjustments for the camera 106 that are based on the projected location. The setting adjustments can be implemented at the camera 106 before the camera 106 reaches the projected location. As a result, once the camera 106 reaches the projected location, the camera 106 can be ready to capture an image of the product identifier.

The instructions generator 312 can generate instructions to execute the pan, tilt, zoom, and/or other camera settings adjustments at the camera 106. The instructions generator 312 can also transmit the instructions to the camera 106. The instructions can indicate how much the settings should be adjusted and what components of the camera 106 can execute such adjustments. Sometimes, the instructions generator 312 can also generate instructions to execute light adjustment settings at the light 105.

In some implementations, the instructions can also indicate a time at which the settings should be adjusted. The instructions can provide for immediate execution of the settings adjustments. The instructions can also provide for execution of the settings adjustments at a later time. For example, the determiners 306, 308, 310, and 311 can predict settings adjustments for the camera 106 when the camera 106 is at a future, projected location. Instructions corresponding to those adjustments can indicate that the setting adjustments can be implemented only if the product identifier is not accurately identified in a currently captured image. After all, adjusting the camera 106 settings while the currently captured image is undergoing image analysis can cause for additional motor movement that may not be necessary. If the product identifier can be accurately identified in the captured image, then the camera 106 does not need to be adjusted to new settings. Instead, the camera 106 can be reset to origin settings and ready to capture images of another product identifier.

The image analysis module 314 can be configured to detect the product identifier in one or more images captured by the camera 106. Image analysis techniques, such as object detection, can be used to identify the product identifier. The module 314 can also be configured to generate a notification indicating whether or not the product identifier is accurately identified. The module 314 can determine that the product identifier is located within the field of view, however the product identifier may not be scanned from the image because the product identifier can appear blurry, too far away, slightly cut off, etc.

If the module 314 determines that the barcode is not identifiable within a captured image, the module 314 can transmit a notification to any one or more of the determiners 302, 304, 306, 308, 310, and 311. Any one or more of the determiners 302, 304, 306, 308, 310, and/or 311 can then determine appropriate adjustments to the camera 106 settings to capture a new image of the product identifier. In some implementations, the image analysis module 314 can also determine movement of the camera 106 within the environment, as described above, and provide the determined movement information to the motion determiner 304.

Still referring to the apparatus 102 in FIG. 3, the camera 106 can include a camera 318, controller 320, optional pan motor(s) 322, optional tilt motor(s) 324, optional zoom motor(s), an optional image analysis module 328, and a communication interface 330.

The camera 318 can be configured to capture images within the camera 106's field of view. The camera 318 can include an image sensor 332 and a region of interest controller 334. The camera 318 can capture images at predetermined time intervals, regardless of whether setting adjustments have been made. In other words, the camera 318 can continuously and automatically capture images of its field of view. These images can be transmitted to the image analysis module 314 for processing. The camera 318 can also capture images upon receiving notification that pan, tilt, and/or zoom settings have been adjusted. In some implementations, the camera 318 can be configured to capture images upon execution of instructions received from the instructions generator 312.

The camera 318 can be a high resolution camera. In some implementations, the camera 318 can be a stereoscopic camera, a 3D camera, a 2D camera, or any other similar imaging device. The camera 318 can be configured to capture still images and/or video.

The image sensor 332 can be configured to capture images. The region of interest controller 334 can be configured to determine whether a portion of the camera 318's field of view should be captured by the image sensor 332 or whether an entire field of view should be captured. The region of interest controller 334 can identify a portion of the field of view that includes a region of interest, such as the product identifier. Once the portion is identified, the region of interest controller 334 can select the portion of the image already captured by the image sensor 332 that corresponds to the region of interest. The region of interest controller 334 can also control the image sensor 332 to only capture the region of interest. Selecting the portion of the image having the region of interest and/or controlling the image sensor 332 to capture only the region of interest can be advantageous to reduce network bandwidth. After all, smaller image sizes or quantities of data can be transmitted between the camera 106 and the edge computing device 104 over the network(s) 118. Additionally, computational resources can be saved and more efficiently used at the edge computing device 104 since the edge computing device 104 may not have to perform additional processing of the image to identify the region of interest.

The controller 320 can be configured to execute the instructions received from the instructions generator 312. The controller 320 can control one or more components of the camera 106, such as the camera 318, pan motor(s) 322, tilt motor(s) 324, and zoom motor(s) 326. In some implementations, the controller 320 can monitor adjustment of the pan, tilt, and/or zoom settings of the camera 106. The controller 320 can also adjust other settings of the camera 106, which can include focus, shutter speed, aperture, and/or sensitivity. Once the controller 320 determines that the settings adjustments have been completed, the controller 320 can notify the camera 318 to capture an image of the product identifier.

In some implementations, the controller 320 can determine or identify current settings of the camera 106. The controller 320 can transmit the current settings to the edge computing device 104, which can be used by the determiners 306, 308, 310, and 311 to determine minimal settings adjustments.

The pan motor(s) 322 can be configured to move based on execution of the instructions from the instructions generator 312. In other words, the controller 320 can execute the instructions, wherein the instructions indicate an amount that the pan motor(s) 322 should be moved. Execution of the instructions by the controller 320 can cause the pan motor(s) 322 to move by the amount indicated in the instructions.

Similarly, the tilt motor(s) 324 can be configured to move based on execution of the instructions. Execution of the instructions by the controller 320 can cause the tilt motor(s) 324 to move by an amount of adjustment indicated in the instructions.

Finally, the zoom motor(s) 326 can move based on execution of the instructions. Execution of the instructions by the controller 320 can cause the zoom motor(s) 326 to move by an amount of adjustment indicated in the instructions.

The camera 106 can optionally include the image analysis module 328. The module 328 can be configured to perform image analysis techniques as described in reference to the image analysis module 314 of the edge computing device 104.

The communication interfaces 316 and 330 can provide communication between one or more of the components described in FIG. 3.

As described further in reference to FIGS. 6-9, the apparatus 102 can include multiple low resolution cameras and one or more other components. For simplicity and illustrative purposes, FIG. 3 depicts only the camera 106 and the edge computing device 104.

Figure 4B:
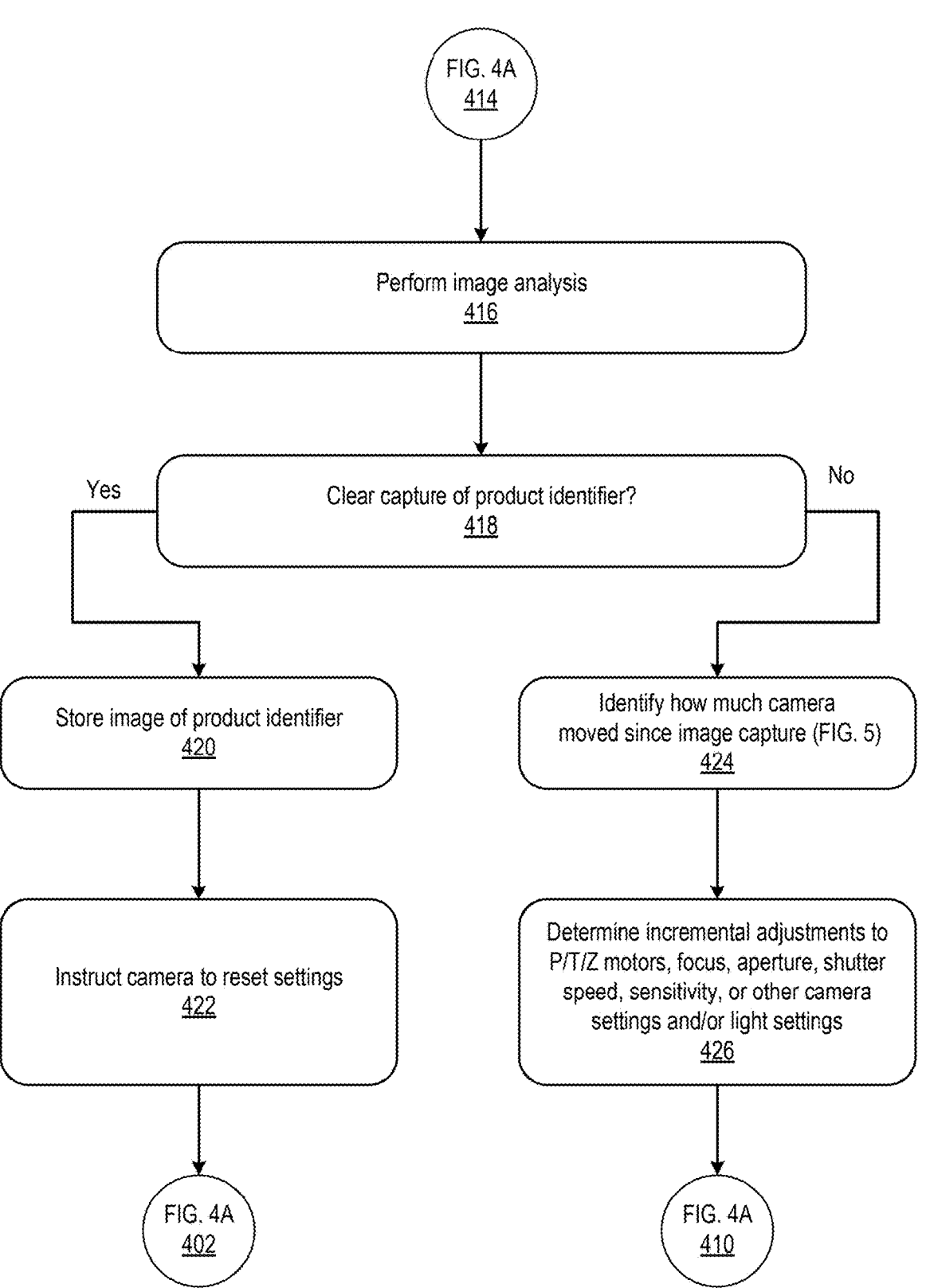

FIGS. 4A-B is a flowchart of a process 400 for iteratively scanning the product identifier. The process 400 can be used to determine incremental modifications that can be made to improve throughput and capture as much as possible through images in an effort to identify the product identifier (e.g., barcode). Moreover, the process 400 can be used to make as many incremental modifications as possible within a predetermined timeframe (e.g., every half second, every second, etc.). The process 400 can be performed by the edge computing device 104. One or more blocks of the process 400 can also be performed by other similar computing systems or devices. For simplicity, the process 400 is described from the perspective of the edge computing device 104.

Referring to the process 400 in both FIGS. 4A-B, the edge computing device 104 can receive x and y coordinates for a location of an out of stock (OOS) shelf section (402). The edge computing device 104 can use the coordinates to detect a product identifier associated with the OOS shelf section. In some implementations, the edge computing device 104 can receive other location information associated with the location of the OOS shelf section. For example, the other location information can include low resolution images of the location that are captured by low resolution cameras that are part of the apparatus (e.g., refer to the apparatus in FIGS. 6-9).

In 404, the edge computing device 104 can determine a frame of reference (FOR). Determining the FOR can include determining where the x and y coordinates are located relative to a location of a camera. The edge computing device 104 can translate the x and y coordinates to a reference point or points for the camera (406). The edge computing device 104 can also determine a current location or movement of the camera, as described throughout this disclosure. Using the current location or movement of the camera, the edge computing device 104 can determine the FOR. As described in reference to FIGS. 1-3, the FOR can be determined based on a speed at which the camera is moving relative to the location of the OOS shelf section. The FOR can also be determined based on comparing still images of the camera that are captured as the camera moves relative to the location of the OOS shelf section.

Moreover, the image data can be tagged or encoded with metadata that can be used to determine the FOR, including but not limited to date, time, location (X, Y coordinates, which can be provided multiple times per second), barcode, angle to shelf, etc.). In some implementations, for example, a machine learning model (e.g., Kalman filter) can be used to determine an X, Y location of the camera. The X, Y location (e.g., X, Y coordinates) can then be translated using trigonometric functions and known distance away from the shelf to determine the FOR. In some implementations, as described throughout this disclosure, the edge computing device 104 may also determine from image data whether a detection area is centered in the frame. If the detection area is not centered in the frame, the edge computing device 104 can determine one or more adjustments and the FOR.

The edge computing device 104 can determine incremental adjustments to pan motors, tilt motors, zoom motors, focus, aperture, shutter speed, sensitivity and/or other settings of the camera (408). In 408, the edge computing device 104 can also determine lighting settings for a light that is part of the apparatus described herein. Sometimes, the edge computing device 104 can also determine whether to crop out portions of an image or whether to capture an entirety of the camera's field of view. As an example, based on determining movement of the camera relative to the location of the OOS shelf section, the edge computing device 104 can determine incremental adjustments that can be made to camera settings such that the camera's field of view aligns with the FOR. The edge computing device 104 can be trained to determine setting adjustments that hone the camera on a location within the field of view that includes the product identifier.

In some implementations, the edge computing device 104 can determine that less than all of the pan, tilt, and zoom motors or other camera settings should be adjusted. For example, the edge computing device 104 can determine that the camera does not need to be tilted but should pan to a right side of the FOR such that the product identifier is more centered within the camera's field of view. The edge computing device 104 can also ensure that any of the determined settings do not cause the camera's field of view to exceed outer boundaries of the FOR. As another example, the edge computing device 104 can determine that the camera should be tilted up and zoomed in to capture the product identifier. Thus, the edge computing device 104 can determine incremental amounts of movement for both the tilt and zoom motors of the camera but not the pan motors of the camera. Any one or more other combinations of incremental adjustments can be determined by the edge computing device 104 and based on movement of the camera relative to the FOR.

The edge computing device 104 can then instruct the camera to adjust by the incremental adjustments in 410. As described herein, the edge computing device 104 can transmit instructions to a controller of the camera. The controller can execute the instructions. Executing the instructions can cause one or more of the pan, tilt, and/or zoom motors or other components of the camera to adjust based on the incremental adjustments determined in 408.

Next, the edge computing device 104 can instruct the camera to capture an image (412). In some implementations, the instructions transmitted to the camera in 410 can include instructions to capture an image. The instructions can indicate that, upon execution of the motor adjustments, the camera can capture the image. The instructions can also indicate that after a predetermined amount of time passes after transmission of the instructions, the camera can capture the image. In some implementations, the camera can transmit a notification to the edge computing device 104 indicating that the motors of the camera have been adjusted. Then, the edge computing device 104 can transmit instructions to the camera that, when executed, cause the camera to capture the image.

The edge computing device 104 can receive the image as well as location information of the camera (414). Once the camera captures the image, the camera can transmit the image to the edge computing device 104. In some implementations, the captured image can be the same as the location information. In some implementations, the location information can be different than the captured image. The location information can include geographic coordinates of the camera or some form of GPS signal indicating a current location of the camera. The location information can also include location identifiers that are determined by one or more location determiners (e.g., the upward facing camera 344 in FIG. 3). The location information can be used by the edge computing device 104 to determine movement of the camera relative to the location of the OOS shelf section.

The edge computing device 104 can perform image analysis on the received image (416). As described herein, object detection techniques can be used by the edge computing device 104 to identify and train in on the product identifier in the image. Other similar techniques can be used to try to identify the product identifier from the image. In some implementations, the edge computing device 104 may also perform object detection techniques to identify the produce in the received image.

The edge computing device 104 can then determine whether the product identifier was clearly captured in the image (418). If the product identifier can be scanned or otherwise read from the image, then the edge computing device 104 can identify a product associated with that identifier. Thus, the product identifier was clearly captured. The edge computing device 104 can store the image of the product identifier (420). The image of the product identifier can be used by the edge computing device 104 to identify and determine what item is supposed to be stored in the OOS shelf section.

Next, the edge computing device 104 can instruct the camera to reset (422). Settings of the camera may no longer need to be incrementally adjusted by minimal amounts to capture images of the product identifier. Resetting the camera settings to origin settings can be advantageous so that the camera can be ready to quickly move on to capturing images of other product identifiers, as described herein. The edge computing device 104 can then return to 402 in the process 400 and repeat 402-422 for subsequent product identifiers that need to be identified.

Returning to 418, in some implementations, the edge computing device 104 may determine that the product identifier is located within the image but product information cannot be detected from reading or scanning the product identifier in that image. This can occur when the image is captured from an undesired angle (e.g., too high, too low), a part of the product identifier is not captured in the image (e.g., the camera's field of view is panned too much to a right or left side of the FOR, thereby cutting off a portion of the product identifier), or the image is blurry (e.g., the camera is too zoomed out or too zoomed in and not focused on the product identifier). Subsequent camera setting adjustments and image capturing may be needed to capture a clearer image of the product identifier.

If the product identifier is not clearly captured, the edge computing device 104 can identify how much the camera moved since the image capture in 424 (e.g., refer to FIG. 5). The edge computing device 104 can use the location information received in 414 to determine movement of the camera. The edge computing device 104 can also compare the location information from 414 with location information of the camera before the process 400 began in order to determine how much the camera moved relative to the FOR.

Based on the camera's movement, the edge computing device 104 can determine incremental adjustments to pan motors, tilt motors, zoom motors, focus, aperture, shutter speed, sensitivity, or other camera settings and/or light settings of the camera in 426. Thus, the edge computing device 104 can determine what adjustments to make to current settings of the camera in an effort to capture a better image of the product identifier. Sometimes, the adjustments determined in 426 can be different than the adjustments determined in 408.

In the example above where the image may be captured from too high of an angle, the edge computing device 104 can determine a minimum amount of movement of the tilt motor(s) to decrease the angle at which the image was captured. As another example, where a portion of the product identifier is cut off on a right side of the image, the edge computing device 104 can determine a minimum amount of movement of the pan motor(s) to move the camera more to a right side within the outer boundaries of the FOR. As yet another example, where the product identifier is blurry in the image, the edge computing device 104 can determine a minimum amount of movement of the zoom motor(s) to zoom into (or out of) the product identifier such that the camera can focus on the product identifier.

As mentioned throughout, the adjustments can be determined within a threshold range, wherein the threshold range ensures that only minimal, incremental changes are made to the camera settings. Moreover, the adjustments to the motors can be dependent on and relative to each other. For example, adjustments to the pan motor(s) can depend on adjustments that are determined for the tilt motor(s). Adjustments to the zoom motor(s) can depend on determined adjustments for one or more of the pan motor(s) and the tilt motor(s). Any other combination of past, current, predetermined, or determined settings can be used to determine new or additional adjustments to the camera settings.

Moreover, as described throughout this disclosure, the edge computing device 104 can determine iterative adjustments. The iterative adjustments can be determined for one or more camera settings, such as focus, zoom, aperture, shutter speed, and sensitivity. For example, where the camera is a stationary camera, iterative adjustments can be made to the cameras zoom and/or focus until the product identifier is clearly and accurately captured by the stationary camera.

Finally, the edge computing device 104 can return to 410 in the process 400 and repeat 410-426 until the product identifier is clearly captured/identified. Once the product identifier is clearly captured/identified, the edge computing device 104 can instruct the camera to reset (422) and repeat the process 400 for subsequent product identifiers that need to be identified.

FIG. 5 is a flowchart of a process 500 for determining a location of a camera used for iteratively scanning the product identifier. The process 500 can be performed as part of block 404 in FIG. 4, in which a frame of reference (FOR) can be determined. The process 500 can also be performed as part of block 424 in FIG. 4. The camera can be continuously moving through an environment. For example, the camera can be moving down an aisle having several shelves with corresponding shelf sections. Within the aisle, the camera can be instructed to identify product identifiers for multiple OOS shelf sections located therein. As described throughout this disclosure, the location of the camera can be identified as the camera is moving and relative to a location of an OOS shelf section. Future locations of the camera can also be predicted. By identifying the location of the camera, adjustments to the camera settings can be more accurately determined. The process 500 can be performed by the edge computing device 104. One or more blocks of the process 500 can also be performed by other similar computing systems or devices. For simplicity, the process 500 is described from the perspective of the edge computing device 104.

Referring to the process 500, the edge computing device 104 can receive x and y coordinates for a location of the OOS shelf section in 502 (e.g., refer to 402 in FIG. 4A). Next, the edge computing device 104 can determine the FOR in 504 (e.g., refer to 404 in FIG. 4A).

In 506, the edge computing device 104 can receive motion information associated with the camera. As described herein, the motion information can be received from an accelerometer that is configured to an apparatus having the camera. The motion information can include a speed and/or direction at which the camera is moving within the environment. The motion information can also include a plurality of still images, or video, of the environment and the camera therein. The images can be captured by cameras within the environment, such as low resolutions attached to the apparatus and/or cameras installed within the environment, such as security cameras. The images can be consecutively captured or at predetermined time intervals.

The edge computing device 104 can then determine an amount of movement of the camera relative to the FOR and based on the motion information (508). The amount of movement can be determined at predetermined time intervals, such as constantly and/or multiple times per second. As described herein, the edge computing device 104 can perform image processing techniques on the still images. The edge computing device 104 can compare the images to identify movement of the camera relative to one or more reference points in the images. The edge computing device 104 can also use the speed and/or direction of camera movement to determine how much the camera has moved since a previous known location or movement of the camera. As described throughout this disclosure, movement of the camera can also be determined using machine learning trained prediction models, including but not limited to a Kalman filter. In some implementations, the models can be used to predict at what time the camera will be positioned in front of a shelf to extrapolate movement of the camera.

The edge computing device 104 can then translate the FOR based on the determined amount of movement of the camera (510). Translating the FOR can be advantageous to more accurately and quickly determine adjustments to the camera settings. Translating the FOR can also be advantageous to more accurately align the PTZ camera's field of view with the FOR. After all, the FOR can always include the OOS shelf section and a location of the product identifier. However, since the camera can move relative to the FOR, the camera's field of view should be updated and focused on the FOR.

Once the FOR is translated, the edge computing device 104 can determine incremental adjustments to pan motors, tilt motors, zoom motors, focus, aperture, shutter speed, sensitivity, or other camera settings and/or light settings in 512 (e.g., refer to 408, 426 in FIGS. 4A-B). The setting adjustments can be determined such that the camera's field of view is focused and trained on the FOR and the location of the product identifier therein. Thus, the edge computing device can be trained to determine setting adjustments that focus the camera on the location of the product identifier rather than other features or objects that may appear in the camera's field of view and in the FOR.

Once the setting adjustments are determined, the edge computing device 104 can perform the process 400 by instructing the camera to adjust by the incremental settings of 512 (e.g., refer to 410 in FIG. 4A). The processes 500 and 400 can be repeated until the camera is no longer moving in the environment and/or the product identifier has been captured and identified. The process 500 can also be performed for each subsequent product identifier that needs to be identified.

Figure 6:
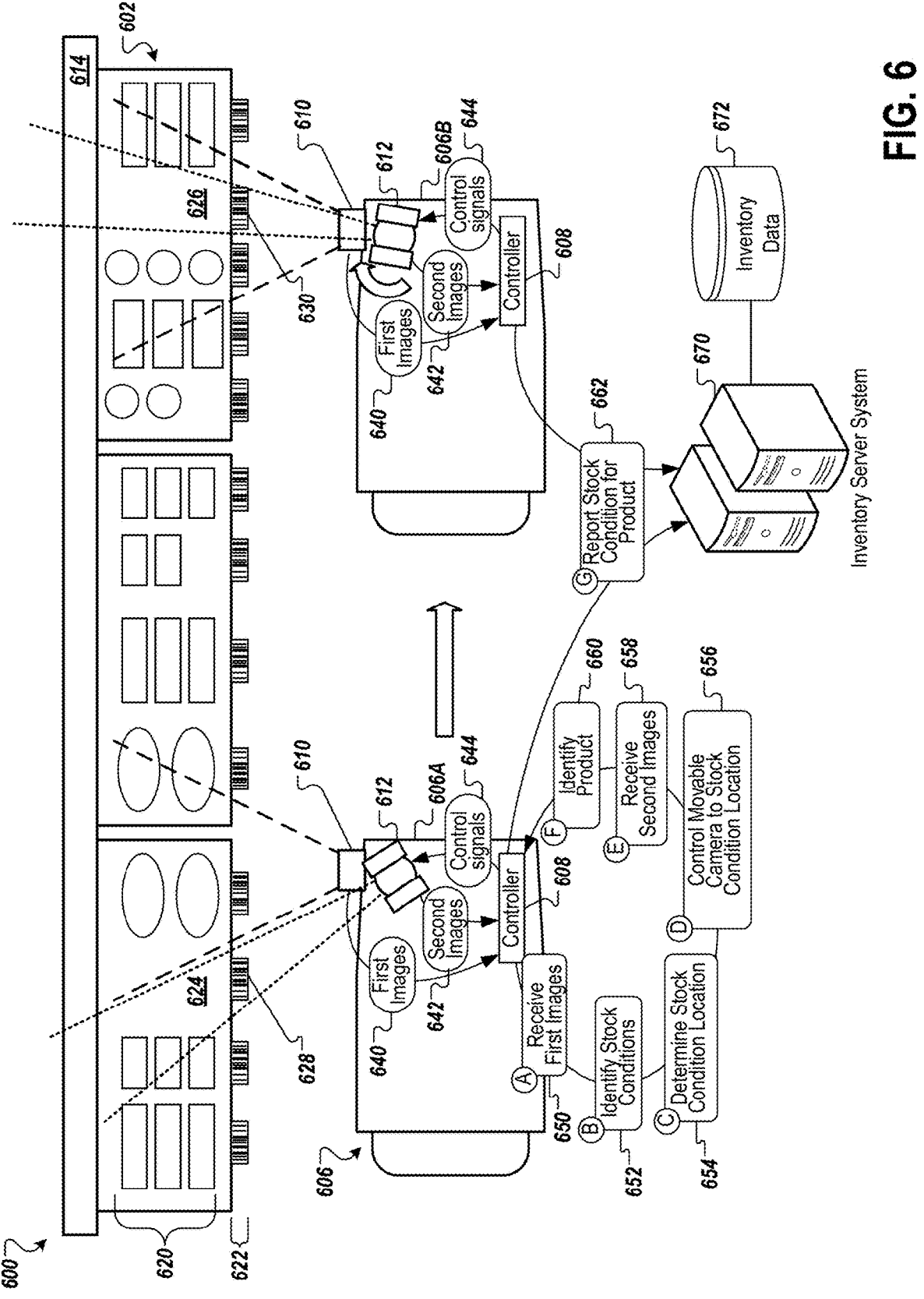
FIG. 6 shows an example system using computer vision to identify stock levels of items on shelves.

FIG. 6 shows an example system 600 using computer vision to identify stock levels of items on shelves 620 on shelves 602. In the system 600, a cart 606 (example of a movable device that apparatus can be a part of or otherwise attached to) is traveling through an aisle or other area of an environment (e.g., retail store) with shelves 602. A fixed camera 610 on the cart 606 can generate low-resolution images of the shelves 602. A movable high-resolution camera 612, such as a pan-tilt-zoom (PTZ) camera, can also be included on the cart 606 to generate high-resolution images of specific locations on the shelves 602.

The shelves 602 can store inventory 622 for sale, storage, staging, etc. The shelves 602 can include a backer surface 614 that forms a vertical wall defining a back of each of the shelves 602. When items 620 are on the shelves 602, the items 620 can occlude view of portions of the backs 614, and when items 620 are absent from the shelves 602, such as at location 624 and location 626 on the shelves 602, more of the backs 614 can be viewed from the perspective of the cart 606. The shelves 602 can additionally include labels 622 that identify the items 620 and that are positioned adjacent to the items 620 on the shelves 602 (e.g., affixed to front surface of shelf). The labels 622 can include, for example, a product description (e.g., product name, manufacturer name, model number), a product price, and one or more unique identifiers for the product, such as a barcode or QR code that provides a UPC code for the product.

The cart 606, shown as 606A earlier and 606B later as the cart moves forward, travels past shelves 602. The cart 606 can be any sort of cart or other device that can be moved through a retail or inventory environment. Examples include, but are not limited to, shopping carts, pallet jacks, floor cleaners, lifts, autonomous inventory-moving robots, etc. In many cases, the cart 606 can include wheels, a handle or other fixture for moving the cart, and hardware (e.g., baskets, motors, scrub brushes, bags, forklift tines) for purposes other than facilitating imaging of the environment (e.g., transporting inventory, cleaning floors).

The fixed camera 610 can be non-movably affixed to the cart 606 to capture images of the environment around the cart 606. This non-movable affixing can include, for example, the camera 610 being encases in integral housings of the cart, being fastened with fasteners (e.g., screws, nuts-and-bolts). The fixed camera 610 can be mounted on the cart 606 at any of a variety of different orientations, such as angled to the side (as depicted in FIG. 6), forward, backward, and/or other orientations. For example, the camera 610 may be mounted orthogonal (i.e. at a right angle to) the direction of travel to the cart. As will be understood, other angles are possible, including angles greater than orthogonal.

The movable camera 612 (e.g., PTZ camera) is mounted to the cart 606 in a cradle with controllable mechanisms (e.g., motors) capable panning and tilting the camera, and the movable camera 612 can further be equipped with controllable structures to optically zoom (e.g., lenses and/or mirrors). As shown, the movable camera 612 can be mounted in a position in the cart 606 such that the movable camera 612 has a point of view into the viewspace of the fixed camera 610 mounted on the cart 606. For example, the movable camera 612 can be mounted adjacent or near the fixed camera 610, such as on the same side of the cart 606 as the fixed camera 610 and within a threshold distance of the fixed camera 610 (e.g., within threshold horizontal distance, within threshold vertical distance, within overall threshold distance). In some cases, the movable camera 612 may be mounted in a common vertical plane or a common horizontal plane as the fixed camera 610.

A controller 608 can also be provided that is communicatively coupled (e.g., wired connection, wireless connection) to both the fixed camera 610 and the movable camera 612. For example, the controller 608 can receive first images 640 from the fixed camera 610 and second images 642 from the movable camera 612. The first images 640 can be low resolution images that provide a broader view of the shelf 602 and the inventory items 620, as indicated by the wider angle defined by the dashed lines emanating from the fixed camera 610. The second images 642 can be high resolution images of more specific areas of the shelf 602 (as indicated by the smaller angle defined by the dotted lines emanating from the movable camera 612) that are achieved by adjusting the movable camera 612 according to control signals 644 provided from the controller 608 to the movable camera 612. For example, the controller 608 can transmit control signals 644 that include, for example, signals to adjust pan, tilt, and zoom for the movable camera 612.

The controller 608 can identify specific items from the shelves 602 that have inventory conditions, such as being out of stock, having low inventory, having at least a threshold level of inventory, and/or other conditions. To accomplish this, the controller 608 can receive the first images 640 from the fixed camera 610, as indicated by step A (650). The controller 608 can analyze the first images 640 to identify stock conditions in the shelf 602, as indicated by step B (652). Such analysis can include, for example, identifying portions of the shelf 602 where at least a threshold area of the back 614 of the shelf 602 is identifiable in the first image from the vantage point of the fixed camera 610, which can indicate an out of stock condition. For instance, in the depicted example, the controller 608 can detect location 624 (for the cart at time 606A) and detect location 626 (for the cart at time 606B) from first images 640 including at least a threshold area depicting the back 614 of the shelf 602— indicating an out of stock condition at locations 624 and 626. Other analysis and conditions may additionally and/or alternatively be detected.

Once an out of stock condition is detected, the controller 608 can determine a physical location on the shelf 602 for the stock condition relative to the position of the cart 606 and the cameras 610/612, as indicated by step C (654). For example, the controller 608 can correlate coordinates from the first image 640 (e.g., x, y coordinates) where the stock condition is detected to a physical location relative to the position of the cart 606. Using the physical location for the stock condition, the controller 608 can generate and transmit the control signals 644 to the movable camera 612, as indicated by step D (656). The control signals 644 can be generated to move and/or otherwise adjust the movable camera 612 so that it is focused in on the area where the stock condition was detected, such as through adjusting one or more motors or other components in the movable camera 612. For example, the control signals 644 can cause the movable camera 612 to move and adjust so it is oriented on the area around the locations 624 and 626.

The controller 608 can then receive second images 642 from the movable camera 612 from the area around the target locations (e.g., locations 624 and 626), as indicated by step E (658), and analyze those second images 642 to identify a product that corresponds to the stock condition, as indicated by step F (660). Identifying the product corresponding to the stock conditions can include the controller 608 analyzing the second images 642 to detect, for example, identifying information (e.g., barcode, UPC number, product name) from product labels 622 that correspond to locations where the stock conditions are detected. For example, the controller 608 can identify the label 628 that corresponds to the location 624 and the label 630 that corresponds to the location 626, and analyze portions of the second images 642 depicting those labels 628 and 630 (e.g., image-based barcode recognition, optical character recognition, object detection techniques) to identify the corresponding product. The identifying information can include, for example, a UPC code or other unique identifier for the product.

The controller 608 can include a network interface that is capable of transmitting detected stock conditions along with product identifiers to an inventory server system 670, which can maintain a database 672 of current inventory levels, as indicated by step G (662). The inventory server system 670 be local and/or remote from the environment (e.g., retail store) where the cart 606 and the shelves 602 are located. For example, the inventory server system 670 and its inventory data 672 may be part of a broader system that is used within an individual retail store by workers to determine when to restock various items 620 on the shelves 602, and/or may be used by remote customers (e.g., mobile device user, desktop user) looking up current availability of items 620 on the shelves 602 through a mobile app or web interface. As a result, the use of the cart 606 to passively and automatically identify inventory conditions for the items 620 on the shelves 602 can provide more accurate and up-to-date inventory information for both internal users and external users. Furthermore, by adding the controller 608 and cameras 610/612 to a fleet of carts 606 and/or other movable devices/apparatus in an environment (e.g., retail store), most if not all of the environment may be traversed within a period of time (e.g., half hour, one hour, 4 hours, 8 hours) across the fleet of carts 606 and/or other devices/apparatus to provide comprehensive and updated stock condition information for the environment.

As discussed in greater detail below, the cameras 610/612 and the controller 608 may be part of the cart 606 and/or may be attachable to the cart 606. In some instances, the cameras 610/612 and the controller 608 can be contained within a common housing that can be mounted to the cart 606. Other configurations are also possible.

Figure 7:
FIG. 7 is an example shopping cart with hardware for computer vision as described herein.
Figure 8:
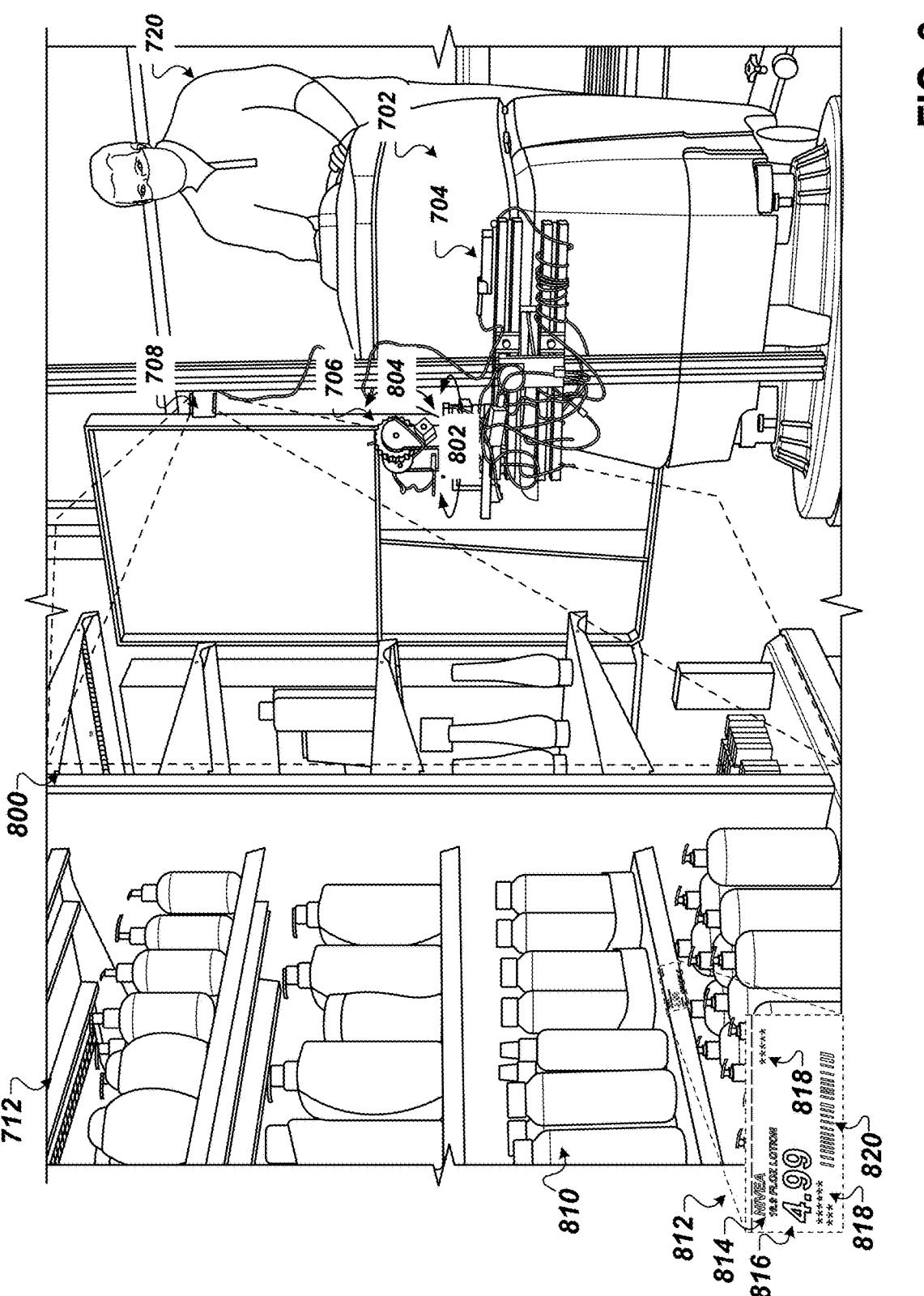
FIG. 8 is an example floor-sweeper with hardware for computer vision as described herein.

FIGS. 7 and 8 depict an example apparatus 700 affixed to a floor sweeping machine 702 to detect physical inventory conditions. The example apparatus 700 can be similar to the apparatus discussed above with regard to FIG. 6. For example, the apparatus 700 an include a local controller and network device 704 (similar to the controller 608), a movable camera 706 (similar to the movable camera 612), and a stationary camera 708 (similar to the fixed camera 610).

The apparatus 700 is also depicted as including a location tracker 710, which can be communicatively coupled (e.g. wired connection, wireless connection) to the controller 704 to provide information identifying a current location of the apparatus 700, such as the location of the apparatus 700 within an interior space, local coordinates within a space, such as a retail environment, GPS coordinates, and/or other location information. The controller 704 can be configured to use the location information for any of a variety of purposes, such as using it in combination with images from the cameras 706 and/or 708 to detect stock conditions for products on shelves 712, and/or using it to report the location where the stock conditions are detected (e.g., reporting stock condition for product with location of apparatus 700 when condition detected).

The apparatus 700 is depicted as being attached to a floor sweeping machine 702 that is manually operated by an operator 720. The apparatus 700 can automatically detect and report stock conditions in the shelves 712 without any input or direction from the operator 720. Additionally, the apparatus 700 can detect and report stock conditions in the shelves 712 passively and without altering the normal operation of the floor sweeping machine 702.

The apparatus 700 is depicted with the movable camera 706 and the stationary camera 708 being positioned along a common vertical plane, with the stationary camera 708 being positioned above the movable camera 706. Other arrangements are also possible, such as the movable camera 706 being positioned above the stationary camera 708, the movable camera 706 and the stationary camera 708 being positioned side-by-side along a common horizontal plane, and/or other configurations. The stationary camera 708 may be positioned at a height and orientation that permits for it to capture an image of the full height of the shelves 712 when the machine 702 is at one or more target distances from the shelves 712. For example, referring to FIG. 8, the stationary camera 708 can be positioned so as to have a field of view 800 that captures the full height of the shelves 712.

Still referring to FIG. 8, the movable camera 706 can have one or more axis of rotation that can provide the example ranges of motion 802 and 804. For example, the movable camera 706 can perform a pan motion 802 permitting the movable camera 706 to capture images forward or backward along the shelf 712 relative to the current location of the machine 702. The movable camera 706 can also perform a tilt motion 804 that can permit capturing images of different vertical positions of the shelf 712.

An example out of stock condition is depicted at location 810, which the controller 704 can detect using the images from the stationary camera 708. The location 810 can have a corresponding label 812 that the controller 704 can identify and analyze using images from the movable camera 706 to identify the product that is out of stock. The label can include any of a variety of information that identifies an intended product for location 810, including a product name and manufacturer 814, a product price 816, numerical product identifiers 818 (e.g., UPC code, retail store identifier, manufacturer identifier), and/or a barcode 820 that identifies the product (e.g., barcode 820 encodes numerical product identifiers in optically readable set of symbols).

Figure 9:
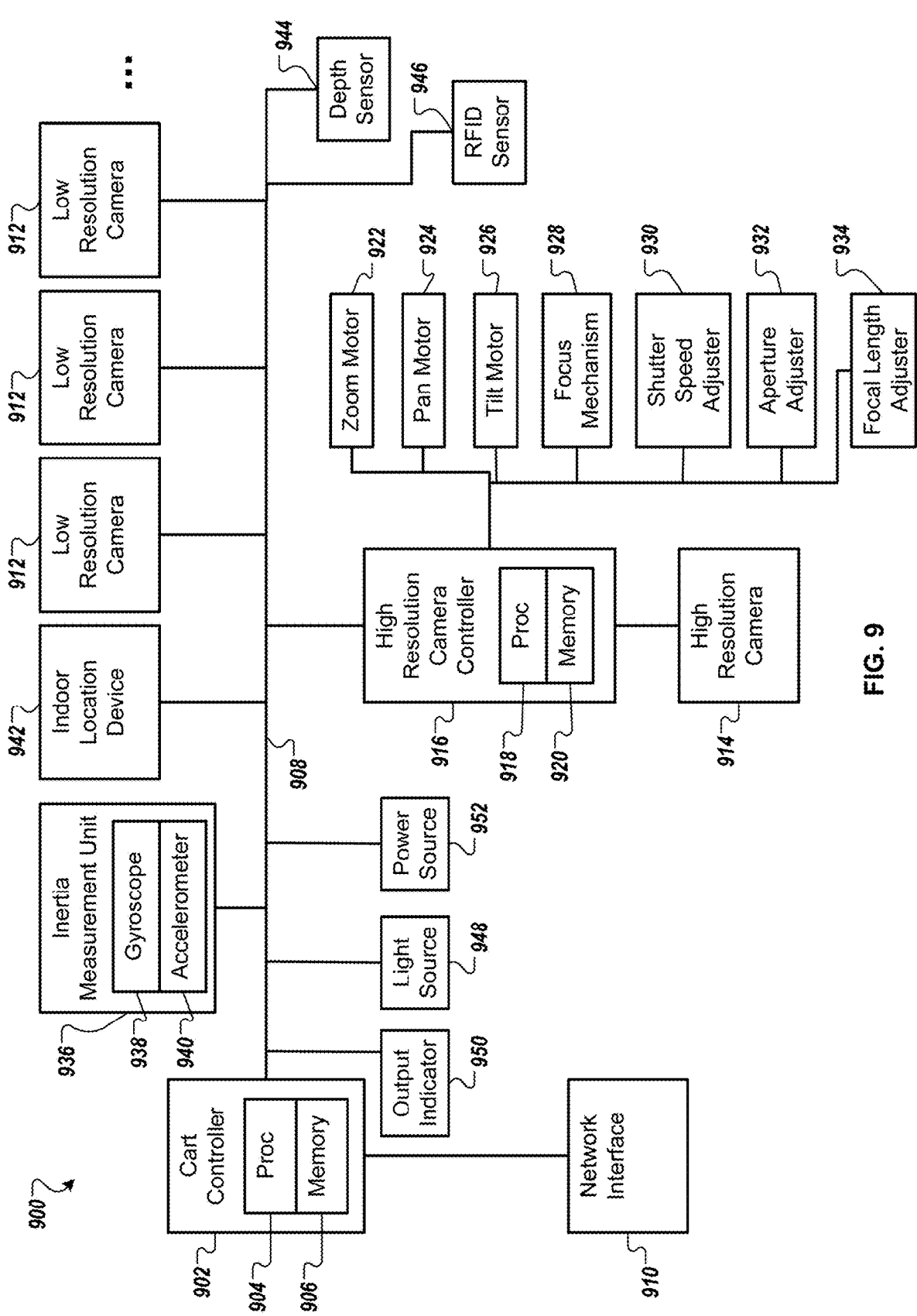
FIG. 9 is an example of computer hardware of a cart for collection and communication of stock levels of items on shelves.

FIG. 9 is an example of computer hardware 900 of a cart for collection and communication of stock levels of items on shelves. For example, the hardware 900 may be integrated into any of the carts or apparatus as described in reference to FIGS. 6-8.

The system 900 can include a cart controller 902 with one or more processors 904 and memory 906. The cart controller 902 can be integrated into the body of the cart, including by having an integrated housing made of a rigid material (e.g., plastic, metal). A data network of the cart 908 can pass through the housing, for example with wires passing through one or more ports, and/or with wireless data signals passing through the rigid material. The cart controller 902 can also be in communication with a power source 930. The power source 930 can provide power to one or more components of the system 900.

The data network 908 can include one or more wired and wireless data links that connect components of the system 900 to allow data communication, electrical power transmission, etc. Data network 908 can sometimes be referred to as a control area network (CAN) or a data bus. A network interface 910 can interface with one or more external data networks and allow elements of the system 900 to communicate with elements of other data processing systems including, but not limited to, remote servers, local computing devices such as smartphones, etc. The network interface can include some, all, or none of the following types of network interfaces: BLUETOOTH, WiFi, Zigbee, and Ethernet. The data network 908 can collect components including but not limited to low resolution cameras 912, a high resolution camera 914, a high resolution camera controller 916, zoom motor 922, pan motor 924, tilt motor 926, focus mechanism 928, shutter speed adjuster 930, aperture adjuster 932, focal length adjuster 934, inertia measurement unit 936, indoor location device 942, depth sensor 944, RFID sensor 946, light source 948, output indicator 950, and/or power source 952. The components 922, 924, 926, 928, 930, 932, 934, 936, 942, 944, 946, 948, 950, and 952 can be optional. In some implementations, fewer than all of the components 922, 924, 926, 928, 930, 932, 934, 936, 942, 944, 946, 948, 950, and 952 may be included.

Low resolution cameras 912 and a high resolution camera 914 can collect image data from the surrounding environment and transmit that image data to the controller 902. The low resolution cameras 912 can include hardware, firmware, and software capable of capturing images that produce less data (e.g., lower resolutions, at a lower framerate, and/or with fewer color) than the high resolution camera 914. For example, the low resolution cameras 912 may capture images every 0.5 seconds in monochrome at a resolution of 1024×600, while the high resolution camera 914 can capture images at 60 Hz in 16 bit at 3840×1600. As will be understood, the cameras 912 and/or 914 may be selectively engaged or disengaged. For example, the controller 902 may collect image data from the low resolution cameras 912 at all times, and may turn on or awaken the high resolution camera 914 only selectively. For example, the high resolution camera 914 may be engaged periodically, in response to the controller 902 identifying an item of interest in data from the low resolution cameras 912, etc. In such a way, the system 900 can gain the benefits of the use of the high resolution camera 914, without requiring the electricity to operate the high resolution camera 914 at all times.

The high resolution camera controller 916, which can include one or more processors 918 and memory 920) can control one or more operations of the high resolution camera 914. While not shown here for example, the controller 916 can receive instructions from the cart controller 902 to adjust pan, tilt, and zoom of the high resolution camera 914. In response, the controller 916 can engage one or more motors accordingly. The zoom motor 922 can engage to zoom the high resolution camera 914 in and out. The pan motor 924 can engage to pan the high resolution camera 914. The tilt motor 926 can engage to tilt the high resolution camera. As other examples, the focus mechanism 928 can be mechanical and/or digital. The focus mechanism 928 can be engaged by the controller 916 to adjust a focus of the high resolution camera 914.

The shutter speed adjuster 930 can be mechanical and/or digital. The shutter speed adjuster 930 can be engaged by the controller 916 to adjust a shutter speed of the high resolution camera 914. Similarly, the aperture adjuster 932 can be mechanical and/or digital. The aperture adjuster 932 can be engaged by the controller 916 to adjust an aperture of the high resolution camera 914. The focal length adjuster 934 can also be mechanical and/or digital. The focal length adjuster 934 can be engaged by the controller 916 to adjust a focal length of the high resolution camera 914.

The inertia measurement unit 936 can be configured to determine how much a mobile apparatus (e.g., a cart) moves throughout an environment, such as a retail environment (e.g., a store), what movements are made by the mobile apparatus, where the mobile apparatus has moved, orientation of the mobile apparatus relative to shelves and other structures or locations in the environment, and depth of field or distance between a shelf and the mobile apparatus. Accordingly, the inertia measurement unit 936 can determine orientation, speed, direction of gravity, and direction of movement relative to the direction of gravity for the mobile apparatus. The inertia measurement unit 936 can include a gyroscope 938 and an accelerometer 940 to detect movement of the mobile apparatus and make the abovementioned determinations.

The indoor location device 942 can be an upward facing camera that determines a location of the mobile apparatus in the environment based on what lights are detected in the ceiling of the environment by the indoor location device 942. For example, the indoor location device 942 can detect lights that are emitted from lightbulbs in the ceiling of the environment and can identify those lights in a lookup table that associates the lights with locations in the environment. The indoor location device 942 can then triangulate a location of the mobile apparatus based on correlating the locations for the lights that are identified via the lookup table. Sometimes, the mobile apparatus may not have the indoor location device 942 and can instead employ a different location positioning system to determine a current location of the mobile apparatus in the environment. For example, the mobile apparatus can utilize Bluetooth beacons or other global positioning devices and signals.

The depth sensor 944 can detect signals or other data that can be used by the controller 916 or the cart controller 902 to determine a depth or distance between the mobile apparatus and a particular shelf, barcode, or other region of interest (ROI) in the environment. The depth sensor 944 can, for example, be a stereoscopic camera. The depth sensor 944 can also use LiDAR and/or infrared sensors to detect depth or distance between the mobile apparatus and a particular shelf, barcode, or ROI.

The RFID sensor 946 can be used to detect and identify inventory conditions for one or more products. When locations in the retail environment are used for storing soft goods or other products that do not have definitive physical structures (e.g., clothes, towels, curtains, etc.), RFID sensor 946 readings can be used to determine whether the soft goods are out of stock. After all, image data may not be as effective in identifying out of stock conditions for products that do not have definitive physical structures that can be identified in image data. As an illustrative example, the indoor location device 942 or another indoor location system can detect current location of the mobile apparatus. When the device 942 detects that the mobile apparatus is located in a region where soft goods are typically stocked, the indoor location device 942 can send a notification to one of the controllers 902 and 916 to engage the RFID sensor 946. When the RFID sensor 946 is engaged, the RFID sensor 946 can capture RFID signal data at the mobile apparatus's current location. Such RFID signal data can be used by the cart controller 902 to determine whether there is an out of stock condition at the current location, instead of using image data captured by the high resolution camera 914.

The light source 948 can be selectively actuated and controlled by the cart controller 902. For example, the cart controller 902 can analyze one or more images captured by the low resolution cameras 912 and/or the high resolution camera 914 to determine whether the environment is too dark. If the images are dark, grainy, and/or blurry, the cart controller 902 can determine that the light source 948 should be actuated to illuminate an area that is imaged by the high resolution camera 914. The light source 948 can be an LED light. The light source 948 can also be an infrared light, a red light, or one or more other types of lights that the high resolution camera 914 is sensitive to. Actuating the light source 948 can be advantageous when the high resolution camera 414 is moving at a speed that causes the captured images to appear blurry and/or grainy.

The output indicator 950 can be configured to output can indication of whether components described herein are operating properly. The output indicator 950 can receive indications from one or more of the components described herein that indicates whether operations are being properly executed. The output indicator 950 can then output, for example, differently colored lights to demonstrate to a user of the mobile apparatus (e.g., a store employee) that the components of the mobile apparatus are functioning properly. For example, the output indicator 950 can output a green light to indicate that the components are operating correctly. The output indicator 950 can output a red light to indicate that one or more components are not working properly, thereby informing the user of the mobile apparatus that they should check the components of the mobile device to resolve the issue.

The power source 952 can be a battery (e.g., rechargeable, replaceable, removable) or other source that powers the components of the mobile apparatus. The power source 952 can be part of or integrated into the mobile apparatus. The power source 952 can also be attached to and in communication with components of the mobile apparatus described above.

Figure 10A:
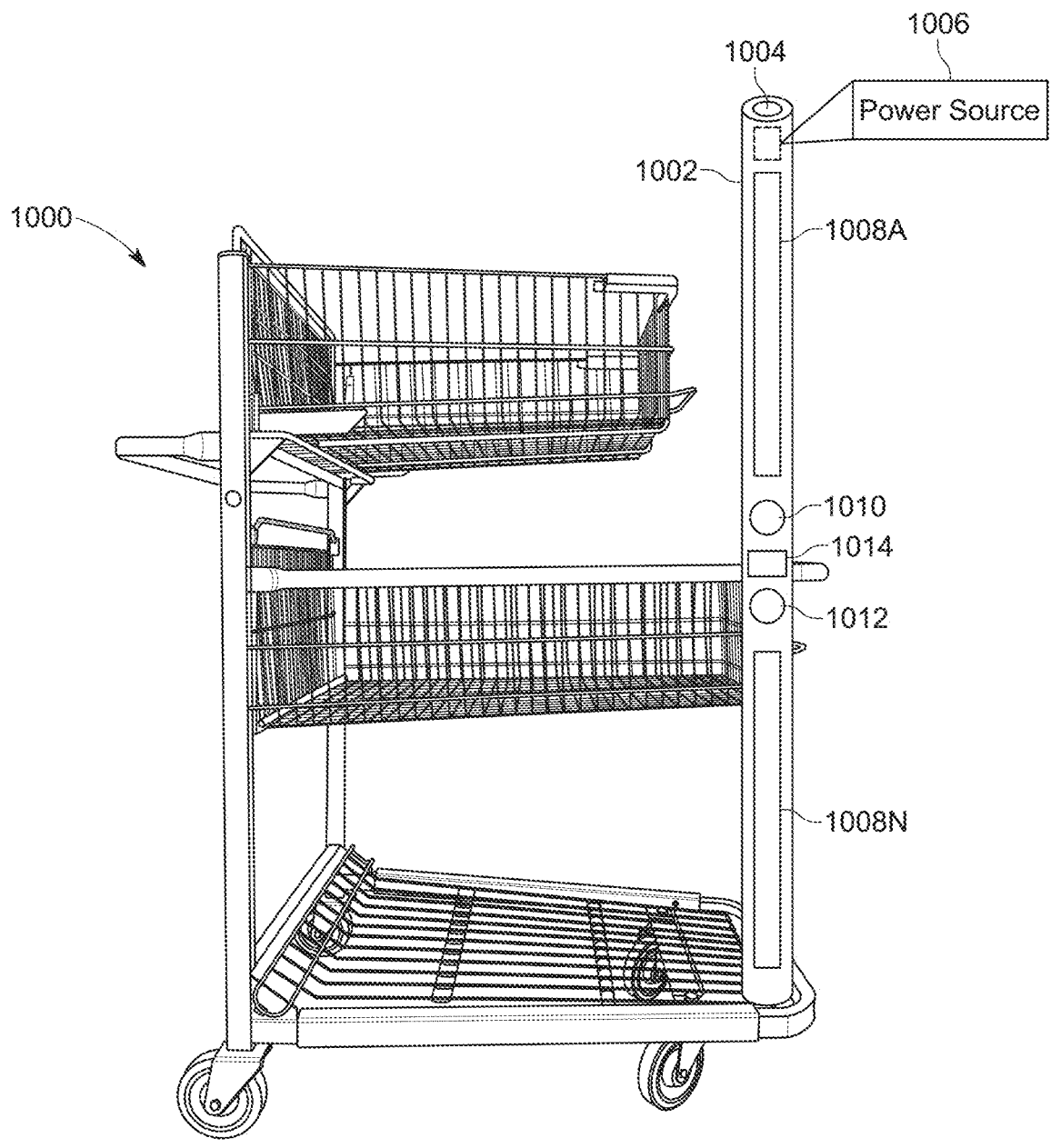
FIGS. 10A-B show example configurations of an apparatus on a cart to detect inventory conditions.
Figure 10B:
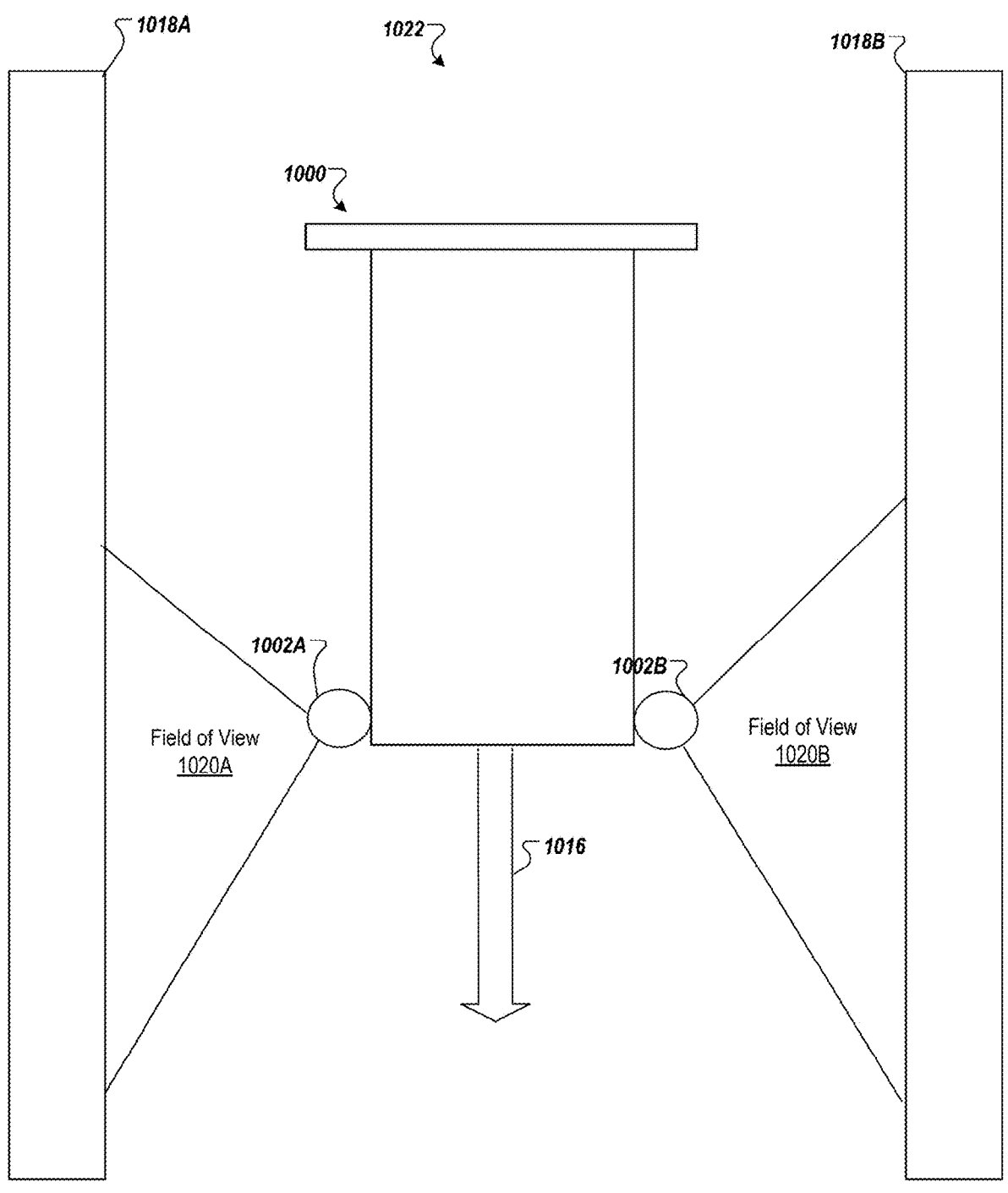

FIGS. 10A-B show example configurations of an apparatus 1002 on a cart 1000 to detect inventory conditions. FIG. 10A depicts a side view of the apparatus 1002 on the cart 1000. FIG. 10B depicts a top down view of the apparatus 1002 on the cart 1000 as the cart 1000 moves through a physical environment, such as a retail store. It shall be noted that the apparatus 1002 is mobile and a user of any size and/or build can attach the apparatus 1002 to a cart, such as the cart 1000, and remove the apparatus 1002 from the cart. The apparatus 1002 can, for example, be lightweight and may include one or more clamps to attach the apparatus 1002 to a side or sides of the cart 1000. Additionally, the user can attach any quantity of the apparatus 1002 to the cart 1000. For example, an apparatus 1002 can be placed at each corner of the cart 1000. As shown in FIG. 10B, an apparatus 1002 can be placed at each front corner of the cart 1000. One or more apparatus 1002 can also be placed along sides of the cart 1000. Moreover, in some implementations, the apparatus 1002 can be clamped or otherwise mounted to one or more tiers (e.g., baskets) of the cart 1000, such as a bottom tier, a middle tier, and a top tier. As shown in FIG. 10A, for example, the apparatus 1002 can be mounted to furthest corners of the bottom tier of the cart 1000 so as to reduce any potential awkwardness for users who are using the cart 1000 (e.g., loading products into the cart 1000, removing products from the cart 1000, etc.). As another example, the apparatus 1002 can be mounted to a far right or far left side of a handle at the back of the cart 1000 to make the cart 1000 easy to operate by the users.

Referring to FIG. 10A, the apparatus 1002 can be a vertical pole that attaches to a portion of the cart 1000. For example, the apparatus 1002 can attach to one or more corners of the cart 1000, such as at a front right and/or a front left corner of the cart 1000. The apparatus 1002 can also be attached anywhere along right and/or left sides of the cart 1000 in some implementations. One or more of the components described herein in the system can be integrated into or otherwise attached to the apparatus 1002.

The apparatus 1002 may include an indoor location device 1004, one or more lights 108A-N, a high resolution camera 1010, a low resolution camera 1012, an output indicator 1014, and a power source 1006. One or more of 1004, 108A-N, 1010, 1012, 1014, and 1006 can be optional. Moreover, the components 1004, 108A-N, 1010, 1012, 1014, and 1006 can be arranged in any desired configuration.

The indoor location device 1004 can be positioned at a top of the apparatus 1002 and pointed upwards towards a ceiling of the retail environment. As described above, the indoor location device 1004 can be an upward facing camera, configured to detect a location of the cart 1000 based on identifying lights in the ceiling of the retail environment. One or more other location positioning methods can be used to determine a current location of the cart 1000 in the retail environment.

One or more of the lights 1008A-N can be configured along a length of the apparatus 1002. The lights 1008A-N can be selectively actuated (e.g., by a cart controller, not depicted in FIGS. 10A-B) to illuminate an area that is imaged by the cameras 1010 and/or 1012. In the example apparatus 1002 of FIG. 10A, there are two lights 1008A-N. The light 1008A is positioned from a top portion of the apparatus 1002 to a midpoint of the apparatus 1002. The light 1008N is positioned from slightly below the midpoint of the apparatus 1002 to a bottom portion of the apparatus 1002. As a result, the lights 1008A-N can illuminate an entire length/height of shelves or another region in the retail environment that may be imaged by the high resolution camera 1010 and/or the low resolution camera 1012. One or more other arrangements of the lights 1008A-N can be utilized. Moreover, the lights 1008A-N can include infrared lights. In some implementations, the lights 1008A-N can be white lights or other visible lights.

The high resolution camera 1010 can be a PTZ camera or other movable camera as described throughout this disclosure. The low resolution camera 1012 can be a fixed camera as described throughout this disclosure. The output indicator

1014 can output a light or other signal that can be viewed by a user of the cart 1000. The signal can indicate whether components of the apparatus 1002 are functioning properly. For example, if the high resolution camera 1010 is unable to adjust one or more movements (e.g., pan, tilt, zoom, focal length, aperture, shutter speed, etc.), then the camera 1010 can transmit a notification to the cart controller and/or the high resolution camera controller (not depicted in FIG. 10A). The controller can instruct the output indicator 1014 to output a red light, which can indicate to the user that one or more components of the apparatus 1002 are not functioning properly. The user can then service or otherwise check the components. The output indicator 1014 can output a green light whenever components described herein are functioning properly. As mentioned, one or more other indicators can be outputted to depict operational stratus of components in the apparatus 1002 and/or the cart 1000.

Finally, the power source 1006 can be integrated into the apparatus 1002. The power source 1006 can also be external to the apparatus 1002 and communicably coupled to one or more components of the apparatus 1002. The power source 1006 can be replaceable, and/or rechargeable. For example, the power source 1006 can be a rechargeable battery that can be charged and/or replaced when it is lower on power and may no longer provide enough power to one or more of the components in the apparatus 1002. In some implementations, the power source 1006 can plug into an outlet or other power source for charging purposes. When the power source 1006 is plugged in, the apparatus 1002 can be assumed to be outside of a main usage mode. The main usage mode can be when the cart 1000 is moving around an environment and images are being captured of the environment. During the main usage mode, only some image data may be transmitted to another computer system as described throughout this disclosure. For example, only image data demonstrating empty spots on shelves, price discrepancies, etc. can be transmitted to the computer system for further processing. Other image data, which can be used for training purposes or other algorithms implemented in the environment can then be transmitted to the computer system when the apparatus 1002 is not in the main usage mode. When not in the main usage mode (for example, the apparatus 1002 can be in batch mode), any and/or all data that is captured by components of the apparatus 1002 can be packaged and transmitted to the computer system described throughout this disclosure for further processing and analysis of out of stock conditions. Therefore, while the power source 1006 is charging, larger batches of data can be transmitted across networks.

Refer to FIG. 9 for further discussion about the components of the apparatus 1002.

Referring to FIG. 10B, the cart 1000 can be moving in an environment 1022. The environment 1022 can be a retail environment, such as a store, as described previously. The cart 1000 can be pushed by a user, such as a store employee. The cart 1000 can also be autonomously operated (e.g., by a robot) and can automatically move throughout the environment 1022. The cart 1000 can move in the environment 1022 and pass shelves 1018A and 1018B. The shelves 1018A and 1018B can include products, that can be in stock or out of stock, as described herein.

In the example of FIG. 10B, the cart 1000 includes two apparatuses 1002A and 1002B. Each of the apparatuses 1002A and 1002B are vertical poles that are attached to front corners of the cart 1000. The apparatuses 1002A and 1002B are described further in FIG. 10A. As the cart 1000 moves in direction 1016, cameras along each of the apparatuses 1002A and 1002B can capture image data of the respective shelves 1018A and 1018B in their respective fields of view 1020A and 1020B.

As an illustrative example, a high resolution camera on the apparatus 1002A can be configured to pan left and right (or perform other operations) to capture image data of the shelf 1018A in the camera's field of view 1020A while the cart 1000 is moving past the shelf 1018A. Similarly, a high resolution camera on the apparatus 1002B can be configured to tilt and zoom (or perform other operations) to capture image data of the shelf 1018B in the camera's field of view 1020B while the cart 1000 is moving past the shelf 1018B.

In some implementations, the cameras on the apparatuses 1002A and 1002B can be operated simultaneously by the cart controller and/or one or more high resolution camera controllers. In some implementations, only components of one of the apparatuses 1002A and 1002B may be selectively controlled and/or operated. In yet some implementations, components of the apparatus 1002A can be selectively controlled while components of the apparatus 1002B are in a sleep mode or other mode in which they are not performing operations described throughout this disclosure.

In some implementations, where the cart 1000 only has one apparatus 1002A, the cart 1000 may move down the aisle such that the camera on the apparatus 1002A captures image data of the shelf 1018A in the field of view 1020A. The cart 1000 can then be turned around and may move in a direction opposite the direction 1016 such that the camera on the apparatus 1002A can capture image data of the shelf 1018B in the field of view 1020A.

Figure 11:
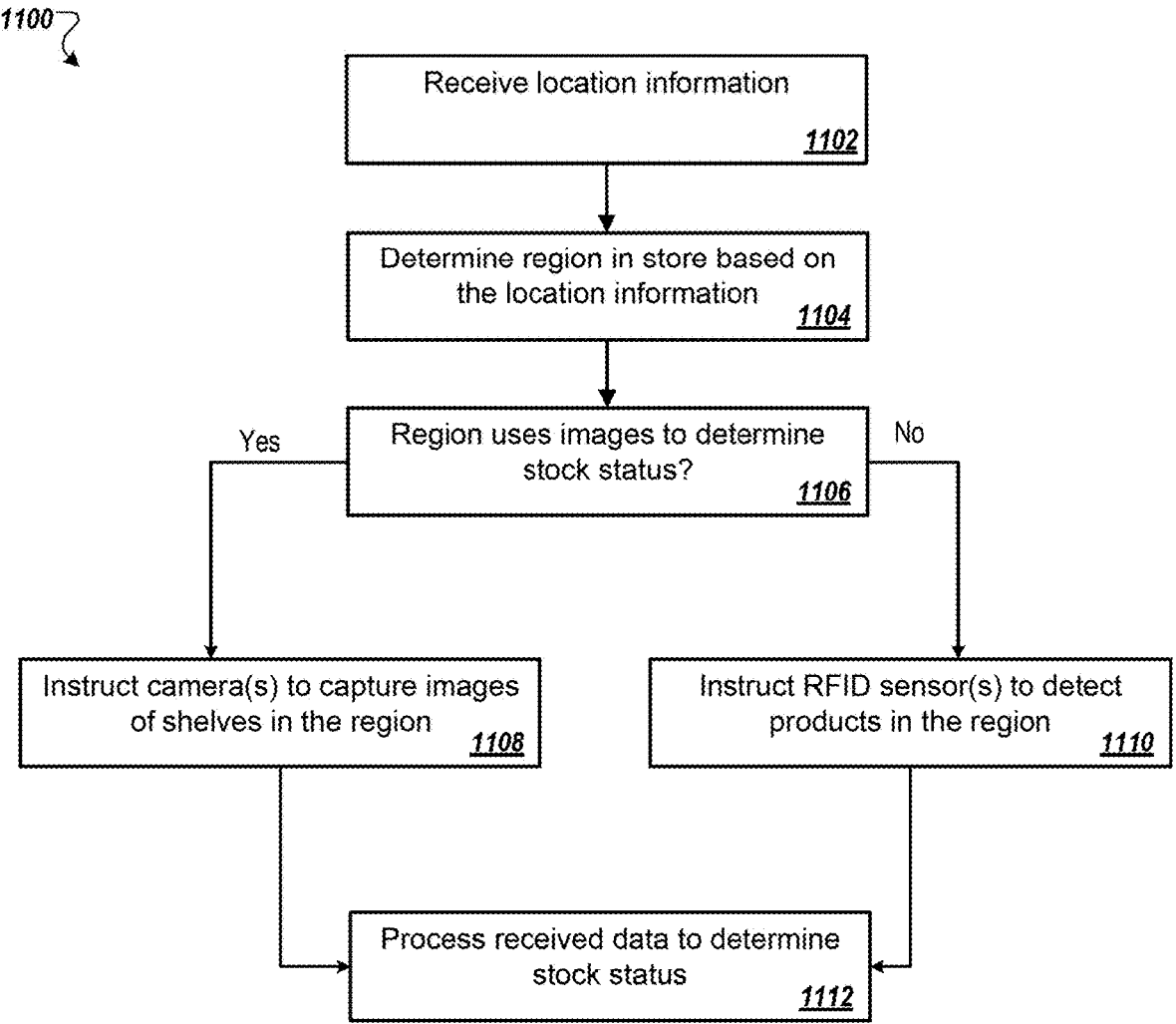
FIG. 11 is a flowchart of an example process for determining whether to use image data or RFID sensor data to detect inventory conditions.

FIG. 11 is a flowchart of an example process 1100 for determining whether to use image data or RFID sensor data to detect inventory conditions. In the process 1100, a cart such as the cart 106 or the cart 1000 can use a system 900 to collect image data and/or RFID sensor data that can be used for detecting inventory conditions. However, other devices and systems can be used to perform the process 1100 and other processes described throughout this disclosure.

Referring to the process 1100, location information is received 1102. For example, the cart controller depicted and described in reference to FIG. 9 can receive location information from one or more components, such as the indoor location device, the inertia measurement unit, one or more of the low resolution cameras, a depth sensor, and/or one or more other devices or sensors that may be positioned throughout an environment where the cart (e.g., mobile apparatus) is located. In some implementations, the cart controller can receive sensor data that can be utilized by the cart controller to determine location information (e.g., a current location) of the cart.

Next, the cart controller determines a region in the store where the cart is located based on the location information (1104). The cart controller can, for example, compare the location information to information in a lookup table. The lookup table can correlate locations (e.g., GPS coordinates, other location-based signals) to actual regions in the environment, such as departments (e.g., groceries, electronics, clothes, furniture, etc.), particular aisles, etc.

The cart controller determines whether the region uses images to determine stock status in 1106. The lookup table can also associate each region with type of products/items and preference for image data or RFID sensor data. Databases or other structured files can also contain associations between regions in the environment and type of data that can be used for determining stock status.

When the products have definite physical structures, image data can be preferred since physical shapes of the products can be more accurately extracted from the image data to determine whether a particular shelf has an out of stock condition. On the other hand, products that do not have definite physical structures may be more challenging to analyze for stock status using image data. As a result, RFID sensor data can be preferred for use in determining a stock status of those products.

As an illustrative example, boxes of cereal can be easily detected from image data for having definite, rigid structures. Those definite, rigid structures can be more easily identified and extracted from an image that contains the cereal boxes on a shelf. On the other hand, clothes can be folded and stacked on a shelf, but sometimes, the stacks of clothes may not have a uniform or definite shape or structure. Clothes can be stacked or heaped on top of each other and may form less definite shapes such as piles of fabric. As a result, identifying the clothes in image data can be more challenging. Instead, RFID sensor data can be used to determine how much of items such as clothes are located on their respective shelf and whether there is an out of stock condition.

If the region uses images for determining stock status, then the cart controller instructs one or more of the cameras to capture images of the shelves in the region (1108). In other words, the region contains products that typically have definitive physical structures. The region can be a cereal and breakfast aisle in a grocery store, by way of example.

Once the camera(s) captures images of the shelf, the camera(s) transmits the image data to the cart controller. The cart controller processes the received data as described throughout this disclosure to determine stock status (1112).

If the region uses RFID sensor data for determining stock status, then the cart controller instructs one or more RFID sensor devices to detect products in the region (1110). In other words, the region contains products that typically have non-definitive physical structures. The region can be a clothing department in a retail store, by way of example.

In some implementations, the RFID sensor devices may be continuously capturing the RFID sensor data regardless of performance of 1102-1106 described above. Therefore, in 1110, the cart controller can simply determine that the RFID sensor data should be used to determine stock status and thus request the RFID sensor data from the RFID sensor devices for use in the determination. In some implementations, the RFID sensor devices may only be turned on and instructed to capture the RFID sensor data when the cart is in a region that does not use images to determine stock status (1106).

Moreover, in some implementations, the cameras may not be continuously capturing images. Rather, the cart controller can selectively turn on the cameras in 1108 when the cart controller determines that the region is one in which image data should be used for determining stock status. Only activating the cameras when they are needed for stock status determinations can save processing power and compute resources. Once the cart controller determines that the cart is located in a region of the store that does not need image data for stock status determinations, the cart controller can turn off the cameras or otherwise instruct the cameras to stop capturing images. Similarly, if the cart controller determines that the cart is standing idle (e.g., the cart has not moved for at least a predetermined period of time), the cart controller can instruct the cameras to stop capturing images to save on power consumption, processing power, and compute resources.

In some implementations, the cameras can be configured to continuously capture images as the cart moves throughout the store, however the images may not all be used for stock status determinations. The images can be continuously captured and if the cart controller determines in 1106 that the region uses images to determine stock status, then the cart controller can request the images of the region from the cameras and use just those images for this determination. Once the cart is standing idle or is plugged in and charging, as described in reference to FIGS. 10A-B, the cart controller can request, from the cameras, all of the images that were captured while the cart was moving. All of the images can then be used by the cart controller or another computer system for other processing and/or analysis of conditions in the store.

Once the RFID sensor(s) detect product data, the sensor(s) transmits the sensor data to the cart controller. The cart controller processes the received data as described throughout this disclosure to determine stock status (1112).

Figure 12:
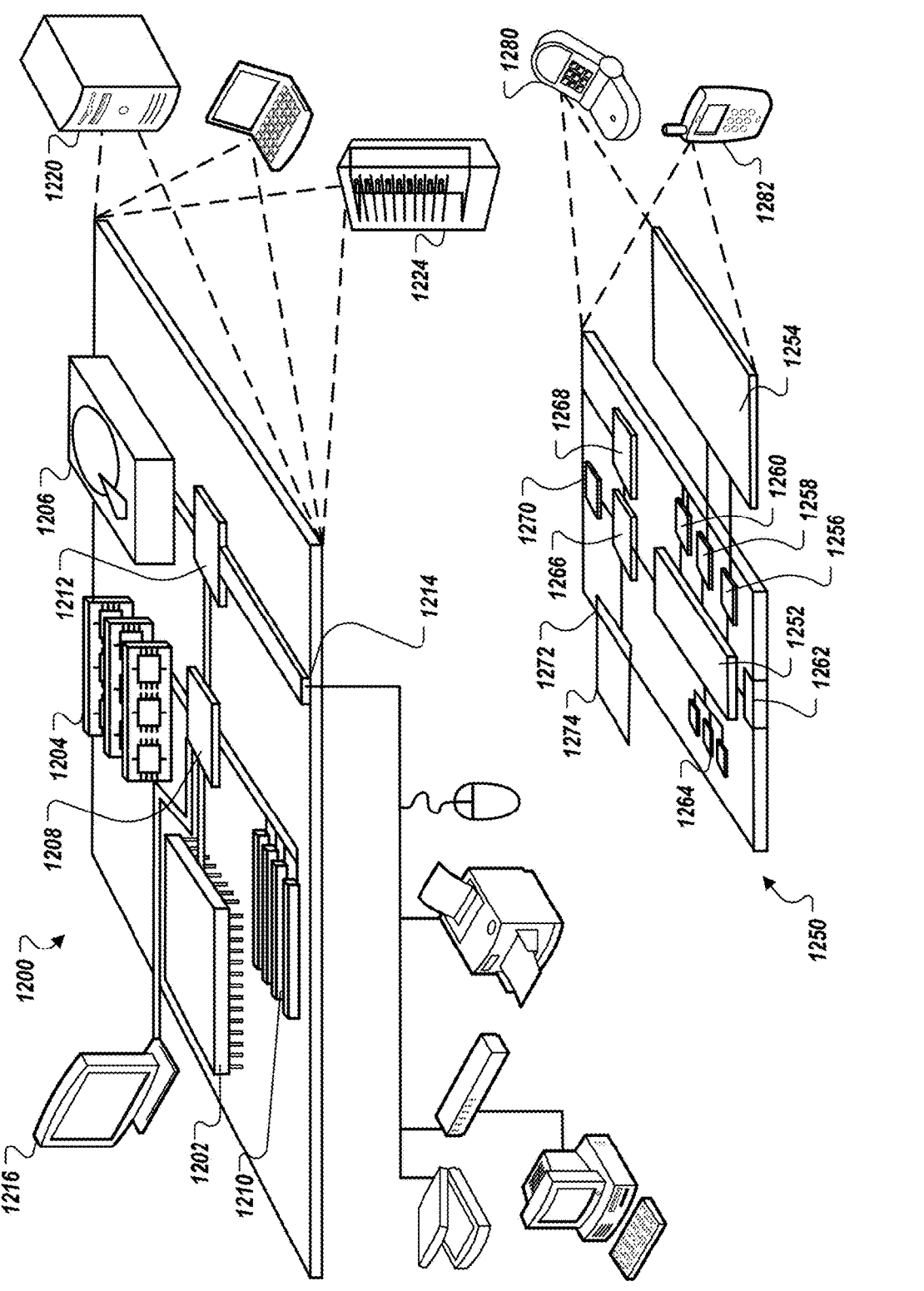
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the computing device 1200. In some implementations, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In the implementation, the low-speed interface 1212 is coupled to the storage device 606 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some implementations, or for wireless communication in other implementations, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250, or can also store applications or other information for the mobile computing device 1250. Specifically, the expansion memory 1274 can include instructions to carry out or supplement the processes described above, and can include secure information also. Thus, for example, the expansion memory 1274 can be provide as a security module for the mobile computing device 1250, and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1270 can provide additional navigation- and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for identifying items in a retail environment, the system comprising:
  a housing configured to attach to a cart, the cart being moved throughout the retail environment, wherein the housing comprises:
    a first camera configured to capture first images of a space surrounding the cart as the cart is moved throughout the retail environment, and
    a second camera that is different from the first camera and configured to capture second images of a particular area in the space surrounding the cart, wherein the particular area in the space surrounding the cart comprises a subset of a field of view of the first camera; and
  a controller comprising one or more processors and memory storing instructions that, when executed, cause the one or more processors to perform operations comprising:
    receiving the first images from the first camera;
    identifying an out of stock condition in the space surrounding the cart based on processing the first images;
    instructing the second camera to iteratively capture the second images of the particular area in the space surrounding the cart in response to identifying the out of stock condition;
    receiving the second images from the second camera; and
    identifying a product in the particular area having the out of stock condition based on processing the second images;
  wherein the controller comprises an edge computing device configured to attach to the housing.

2. The system of claim 1, wherein processing the second images comprises identifying a product identifier of the product in the second images using object detection techniques.

3. The system of claim 1, wherein the out of stock condition is identified based on identifying a threshold area of the first images that resembles a shelf feature in the space surrounding the cart.

4. The system of claim 1, wherein the controller is further configured to identify the particular area in the space surrounding the cart that corresponds to a location of the identified out of stock condition in the first images.

5. The system of claim 1, wherein the controller is further configured to:
  predict a location of the second camera relative to the particular area in the space surrounding the cart;
  determine a field of view of the second camera at the predicted location;
  determine incremental adjustments to the second camera that align the field of view of the second camera with a frame of reference that corresponds to the particular area in the space surrounding the cart; and
  transmit the incremental adjustments to the second camera for execution as the cart moves throughout the retail environment relative to the predicted location, wherein the second camera is configured to capture the second images in response to execution of the incremental adjustments.

6. An apparatus for identifying items in a retail environment, the apparatus comprising:
  a housing configured to attach to a portion of a cart, the cart being moved throughout the retail environment, wherein the housing comprises a vertical pole;
  a first camera attached to the housing and configured to capture first images of a space surrounding the cart as the cart is moved throughout the retail environment; and
  a second camera that is different from the first camera and attached to the housing, wherein the second camera is configured to capture second images of a particular area in the space surrounding the cart based on an identification of a shelf feature in the first images, wherein the particular area in the space surrounding the cart comprises the shelf feature, wherein the particular area in the space surrounding the cart is a subset of a viewpoint of the first camera.

7. The apparatus of claim 6, wherein the apparatus further comprises a controller configured to:
  receive the first images;
  process the first images to determine whether a threshold area in the first images resembles the shelf feature;
  instruct the second camera to iteratively capture the second images in response to determining that the threshold area in the first images resembles shelf feature;
  receive the second images; and
  process the second images.

8. The apparatus of claim 7, wherein processing the second images comprises determining an out of stock condition of products that are detected in the second images.

9. The apparatus of claim 7, wherein processing the second images comprises identifying each product in the second images based on detecting a corresponding product identifier using object detection techniques.

10. The apparatus of claim 6, wherein the first camera is a fixed camera.

11. The apparatus of claim 6, wherein the second camera is a moveable camera.

12. The apparatus of claim 6, wherein the first camera is a low resolution camera and the second camera is a high resolution camera.

13. The apparatus of claim 6, wherein the housing is configured to attach to a front corner of the cart.

14. The apparatus of claim 6, wherein the apparatus further comprises a light attached to the housing.

15. The apparatus of claim 14, wherein the light is configured to be selectively actuated to illuminate an area that is being imaged by the first camera or the second camera.

16. The apparatus of claim 6, wherein the apparatus further comprises an output indicator attached to the housing and configured to be selectively illuminated in response to determinations being made by a controller of the apparatus.

17. An apparatus for identifying items in a retail environment, the apparatus comprising:

a housing configured to attach to a portion of a cart, the cart being moved throughout the retail environment;

a first camera attached to the housing and configured to capture first images of a space surrounding the cart as the cart is moved throughout the retail environment;

a second camera that is different from the first camera and attached to the housing, wherein the second camera is configured to capture second images of a particular area in the space surrounding the cart based on an identification of a shelf feature in the first images, wherein the particular area in the space surrounding the cart comprises the shelf feature, wherein the particular area in the space surrounding the cart is a subset of a viewpoint of the first camera; and an indoor location device attached to the housing, positioned at a top of the housing, and facing a ceiling of the retail environment, wherein the indoor location device is configured to detect a location of the cart based on identifying lights in the ceiling of the retail environment as the cart is being moved throughout the retail environment.

18. The apparatus of claim 17, wherein the apparatus further comprises a controller configured to:

receive the first images;

process the first images to determine whether a threshold area in the first images resembles the shelf feature;

instruct the second camera to iteratively capture the second images in response to determining that the threshold area in the first images resembles shelf feature;

receive the second images; and process the second images.

19. The apparatus of claim 18, wherein processing the second images comprises determining an out of stock condition of products that are detected in the second images.

20. The apparatus of claim 18, wherein processing the second images comprises identifying each product in the second images based on detecting a corresponding product identifier using object detection techniques.

* * * * *